(12) United States Patent
Blouvshtein et al.

(10) Patent No.: US 11,379,346 B2
(45) Date of Patent: Jul. 5, 2022

(54) SYSTEMS AND METHODS FOR DEBUGGING AND APPLICATION DEVELOPMENT

(71) Applicant: Lightrun Platform LTD, Tel Aviv (IL)

(72) Inventors: Leonid Blouvshtein, Tel Aviv (IL); Ilan Peleg, Tel Aviv (IL)

(73) Assignee: Lightrun Platform LTD, Tel Aviv (IL)

( * ) Notice: Subject to any disclaimer, the term of this patent is extended or adjusted under 35 U.S.C. 154(b) by 0 days.

(21) Appl. No.: 17/317,254

(22) Filed: May 11, 2021

(65) Prior Publication Data

US 2021/0357308 A1    Nov. 18, 2021

Related U.S. Application Data

(60) Provisional application No. 63/023,474, filed on May 12, 2020.

(51) Int. Cl.
*G06F 9/44*    (2018.01)
*G06F 11/36*    (2006.01)

(52) U.S. Cl.
CPC ...... *G06F 11/3644* (2013.01); *G06F 11/3636* (2013.01); *G06F 11/3664* (2013.01)

(58) Field of Classification Search
None
See application file for complete search history.

(56) References Cited

U.S. PATENT DOCUMENTS 9,715,593 B2    7/2017    Daymont
10,599,852 B2    3/2020    Daymont 2002/0156825 A1*    10/2002    Hoover, Jr. .......... G06F 11/323
714/E11.181

(Continued)

FOREIGN PATENT DOCUMENTS

GB    2504496 A    2/2014
WO    2020080515 A1    4/2020

OTHER PUBLICATIONS

International Search Report and Written Opinion dated Aug. 15, 2021 in PCT Application No. PCT/IB2021/000317.

(Continued)

*Primary Examiner* — Qamrun Nahar
(74) *Attorney, Agent, or Firm* — Occhiuti & Rohlicek LLP

(57) ABSTRACT

Disclosed are implementations for software debugging and application development, including a software debugging method that includes receiving from a remote device, by an instrumentation agent operating at an application system, one or more instrumentation requests for application data resulting from execution of an application process on the application system, processing the instrumentation requests to generate injection point objects, inserting the objects into code (e.g., bytecode) of the application process, and capturing blocks of application data resulting from the inserted one or more injection point objects. At least one injection point objects includes a multi-point object that includes multiple cooperating object parts that are each inserted into one of multiple insertion points of the code, with the multi-point injection point object configured to capture application data generated from execution of a segment of the code bounded by the multiple insertion points of the code corresponding to the multiple object parts.

20 Claims, 5 Drawing Sheets

(56) References Cited

U.S. PATENT DOCUMENTS

| | | | |
|---|---|---|---|
| 2008/0005730 A1* | 1/2008 | Inamdar | G06F 11/364 |
| | | | 717/158 |
| 2009/0172653 A1 | 7/2009 | Elliott | |
| 2010/0114999 A1* | 5/2010 | Qi | G06F 11/3485 |
| | | | 707/E17.014 |
| 2011/0138363 A1 | 6/2011 | Schmelter et al. | |
| 2013/0152064 A1 | 6/2013 | Gagliardi | |
| 2013/0283102 A1 | 10/2013 | Krajec et al. | |
| 2013/0305094 A1 | 11/2013 | Hopley | |
| 2014/0129719 A1* | 5/2014 | Weber | H04L 47/823 |
| | | | 709/226 |
| 2018/0253369 A1 | 9/2018 | O'Dowd et al. | |
| 2019/0205242 A1 | 7/2019 | Weis et al. | |

OTHER PUBLICATIONS

Rennie, Jeffrey. "Stackdriver Debugger Safety Features." Medium, Google Cloud—Community, Mar. 28, 2018.

* cited by examiner

SYSTEMS AND METHODS FOR DEBUGGING AND APPLICATION DEVELOPMENT

CROSS-REFERENCE TO RELATED APPLICATIONS

This application claims priority to, and the benefit of, U.S. Provisional Application No. 63/023,474, entitled "Debugging Systems and Methods for Application Processes," and filed May 12, 2020, the content of which is incorporated herein by reference in its entirety.

BACKGROUND

The present disclosure is directed to software development tools, and more particularly to debugging systems and methods for application development.

To identify the root cause of a production problem (logical bug, performance issue, downtime, etc.), developers either review runtime logs/performance metrics, and/or attempt to reproduce the problem in a development/test environment. Log files and APM solutions are great sources of information—they can often identify defects in an application. However, they are relevant mostly for issues anticipated during the development stage. With the adoption of microservices and serverless architectures, the gap between production and development environment widens. This gap makes it hard to reproduce or anticipate production-only issues, and thus makes it difficult to efficiently remedy such production environment problems.

SUMMARY

Described herein are application development and debugging platforms adapted for analyzing and monitoring live processes (i.e., processes already operating in a production environment) without requiring such executing processes to halt execution (e.g., when reaching injection points), and with the system state associated with the process being monitored only minimally (if at all) impacted. As will be discussed in greater detail below, the debugging and application development platform (e.g., the Lightrun Cloud™, which is a debugger platform allowing a developer to troubleshoot production applications live from within an IntelliJ IDE application) is configured to generate multipoint objects (e.g., implementing multiple script injection points for a single object so that the object spans a code interval/segment, rather than being injected into a single point at the code for the process) to achieve improved data capture management (in terms of the level of data being captured, and control of the conditions to trigger specific injection point objects). The platforms described herein allow developers a powerful tool to troubleshoot bugs in running production systems (everything from logic bugs based on developer errors, to performance and synchronization issues). These are the types of bugs that are generally extremely difficult to find, but increasingly common while orchestrating complex distributed systems. The platforms and implementations described herein can shorten development processes significantly by skipping iterative deployment cycles when adding logs, metrics, and traces, and providing enhanced observability into the production environment that is generally not available to developers.

The platforms described herein can implement dynamic observability of data capture based on dynamic conditions that exist at the time an injection point object is triggered or activated. Additional features of the platforms described herein include an evaluation process (referred to a sandbox) that can be invoked to allow injection point objects (which may be generated, in response to requests sent remotely by a user, at an instrumentation agent attached to one more processes that are to be analyzed/monitored) to be analyzed and executed without adversely impacting (or minimally impacting) the executing application process or the application system. If an injection point is determined to be safe for execution within the application process (e.g., if a similar injection point, or a portion thereof, listed in a "safe list", was previously safely executed without causing adverse effects), the evaluation process is either not invoked, or if invoked (e.g., the check of the injection point against existing lists of objects that were previously determined to be safe or unsafe is performed as part of the evaluation process) the evaluation process is terminated, execution returns to the application process being monitored, and the injection point object is injected into the executing code (e.g., bytecode) for evaluation.

The platforms and implementations described herein give developers observability into running code, and pinpoint specific issues directly within the IDEs and CLIs they already use. The platform (e.g., the Lightrun Cloud™ mentioned above) can be optimized for debugging modern application architectures like microservices and serverless systems, where the degree of difficulty, to pinpoint and reproduce bugs in production, is very high since services and instances run across more than one machine, in scale, and the system is highly asynchronous. The approaches described herein allow for versatility and usability on numerous application platforms that include Docker™ and Kubernetes™, Spring Boot™, Tomcat™, Jetty, Django™ microservices frameworks like MicroProfile™ and Quarkus™, and distributed frameworks for big data management and stream processing, such as Apache Spark™, and Apache Flink™.

Historically, observability into production applications relies on the paradigm of collecting massive volumes of logs, storing those logs, then analyzing them. In the past the process was manual and now, as the amount of logs increases, there are more modern tools to analyze them, detect anomalies and run queries e.g., Log Management tools (Elastic, Splunk, etc.) and APMs like New Relic™, Datadog™, and other popular tools. The implementations described herein (e.g., Lightrun Cloud™) invert the model—instead of logging everything and working backwards, the platform gives developers "shift left" observability from within the tools they already use (IDEs, CLIs, VCS), and the ability to add log lines to running applications. This new paradigm allows developers to own debugging within the software development lifecycle, reducing the time to discovery and reproduction of bugs, and significantly cutting operational and observability costs. The implementations and platforms described herein can be used in the following situations and scenarios:

SaaS Debugging—In multi-tenant SaaS applications, bugs are hard to detect during development and testing, because issues tend to be specific to configuration-/tenant-/user environment-variables. These issues tend to only surface in production, and the platforms described herein give developers a way to pinpoint the specific environmental dynamics of where the problems are occurring in running code.

Complicated Performance Issues—Many performance issues can only be pinpointed when software is running in production, due to scale, races, data volumes and other strains that are only present in the production environment. In production environments, profilers and packet analyzers impose too big of a footprint as they instrument every invocation of every piece of code, every function innovation, and exit. The platforms described herein bring a more surgical approach to generating performance metrics like time measurements, counters and more, while presenting a very small footprint and keeping the service reliable.

Distributed Frameworks—Frameworks give powerful capabilities to developers building distributed applications, but they also present many opportunities for bugs. Apache Spark™ jobs, for example, are full of unique real-data problems like fuzzy records, performance problems due to bad partitioning, serialization errors and more. The platforms described herein allow developers to inspect a live Spark job, capture real-time data, and inspect the RDD without bringing the application down. The platforms allow developers to capture the many benefits of distributed applications, while shortening the debugging process and allowing bug detection in real-time instead of waiting for redeployments and reproducing environments.

Thus, in some variations, a first software debugging method is provided that includes receiving from a remote device, by an instrumentation agent operating at an application system, one or more instrumentation requests for application data resulting from execution of an application process on the application system, processing the received one or more instrumentation requests for application data to generate one or more injection point objects configured to obtain blocks of application data, inserting the one or more injection point objects into code (e.g., bytecode, also referred to as running code) of the application process, and capturing one or more blocks of application data resulting from the inserted one or more injection point objects during the execution of the application process without causing stoppage of the execution of the application process. At least one of the injection point objects comprises a multi-point injection point object that includes multiple cooperating object parts that are each inserted into one of multiple insertion points of the code for the application process, the multi-point injection point object configured to capture application data generated from execution of a segment of the code for the application process bounded by the multiple insertion points of the code corresponding to the multiple object parts of the multi-point injection point object.

Embodiments of the first method may include at least some of the features described in the present disclosure, including one or more of the following features.

The application system may include one or more production-environment servers, and the application process may include a production-environment process.

The method may further include attaching the instrumentation agent to one or more application processes executing on the application system.

Capturing the one or more blocks of application data may include determining level of server resources usage during execution of the production environment process, and capturing a block of application data in response to a determination that the level of computing resource usage is below a predetermined resource threshold.

The computing resource usage may include one or more of, for example, CPU usage for processing captured application data, storage resources for the captured application data, and/or transmission resources to communicate the captured application data to the instrumentation agent.

Generating the one or more insertion point objects further may include generating one or more of, for example, a snapshot injection point object configured to capture state data associated with the executing application process, and/or a log print injection point object.

The multi-point object may include a multi-point script object configured to perform write operations into a dedicated memory area for the instrumentation agent shared by script injection point objects.

Generating the multi-point object may include generating a counter script injection point object configured to count number of occurrences of a line of code for the executing application process.

Generating the multi-point object may include generating a trace script injection point object to cause capture of trace data for the executing application process.

Generating the multi-point object may include generating a TicToc script injection point object comprising a root object and an associated leaf object. Inserting the one or more injection point objects may include inserting the root object into a starting location of a specified section of the code of the application process, and inserting the leaf object into an end location of the specified section of the code. Capturing the one or more blocks of application data may include capturing the application data for the executing application process corresponding to the specified section of the code based on the inserted root object and leaf object.

Capturing the one or more blocks of application data for the executing application process may include obtaining statistical information associated with occurrences of samples for a particular object, including one or more of, for example, number of the occurrences of the samples, minimum duration length of a first sample from the occurrences of the samples, maximum duration length of a second sample from the occurrences of the samples, mean duration of the samples, standard deviation of durations of the samples, and/or a histogram of the durations of the samples.

Receiving the one or more instrumentation requests for application data from the remote device may include receiving the one or more instrumentation requests from a remote intermediate management server configured to receive control input from a separate remote user terminal, different from the application system, to control the instrumentation agent. The remote intermediate management server may further be configured to control communication between a plurality of deployed instrumentation agents, that include the instrumentation agent at the application system, and a plurality of remote user terminals.

The one or more instrumentation requests may include an instrumentation request comprising information to cause adjustment of at least one segment of running code, corresponding to a source code segment for outputting data at a first observability level, into a modified conditional running code segment for outputting the data at a second observability data different from the first observability level. The instrumentation request may include further information to specify one or more of, for example, location of statements to be adjusted from the first observability level to the second observability level, and/or one or more contextual conditions to trigger the modified conditional running code. The method may further include identifying, by the instrumentation agent, the at least one segment of running code for the application process for outputting data at a first observability level, and modifying the identified at least one segment of running code into a modified conditional running code segment configured to output the data at the adjusted second level of observability upon determination that contextual information, representative of current (existing) contextual conditions associated with the application system, matches at least some of the one or more contextual conditions included with the instrumentation request. The contextual information may include one or more of, for example, identity information of the executing application process being executed, identity information of one or more users associated with the executing application process, dynamic system characteristics of the application system on which the application process is executing, alerts generated by an alert system of the application system on which the application process is executing, and/or system configuration information.

The method may further include determining risk of adverse impact by an injection point object, from the one or more injection point objects, on one or more of, for example, performance of the application system, and/or state of the application system, and processing the injection point object based, at least in part, on the determined risk of adverse impact by the injection point object. Processing the injection point may include evaluating the injection point object by the application process in response to a determination that the injection point object is safe for evaluation by the executing application process, evaluating the injection point object by an evaluation process in response to a determination that the injection point object has an uncertain risk of adverse impact, or performing mitigation operations in response to a determination that the injection point object is associated with a high risk of causing adverse impact. The evaluation process may be implemented as an interpreter for the injection point object being evaluated. Determining the risk of adverse impact by the injection point object may include comparing one or more portions of the injection point object to lists containing portions of at least some injection point objects, each of the lists being associated with a risk level representative of the risk of adverse impact on the application system by expressions within the respective each of the lists. The lists may include a safe list that includes injection point object portions determined to be safe to execute by application processes on the application system, and an unsafe list that includes other portion of other injection point objects determined to be unsafe to execute application processes on the application system. Processing the injection point object may include evaluating, in response to a determination that all portions of the injection point object are included in the safe list, evaluating the injection point object within the application process, aborting, in response to a determination that a portion of the injection point object is included in the unsafe list, aborting execution of the injection point object, and/or evaluating, in response to a determination that at least one portion of the evaluated injection point object is not included in the safe list or the unsafe list, the injection point object within the evaluation process.

Processing the received one or more instrumentation requests may include determining local source code information available at the application system for the executing application process, comparing the local source code information to remote source code information, included with the received one or more instrumentation requests, regarding remote source code available to a user interacting remotely with the application system via the remote device, with the remote source code corresponding to the executing application process, and performing one or more actions in response to a determination of a mismatch or a match between at least some of the local source code information and the remote code source information. Comparing the local source code information to the remote source code information may include comparing local source code versioning information included with the local source code information to remote source code versioning information included with the remote source code information. Performing the one or more actions may include sending a mismatch notification in response to a mismatch between the local source code versioning information and the remote source code versioning information. The method may further include aggregating information regarding the mismatch between the local source code versioning information and the remote source code versioning information into a global list of versioning mismatch information accessible by a plurality of instrumentation agents operating at the application system.

Comparing the local source code information to the remote source code information may include determining from the local source code information local code characteristics associated with the one or more instrumentation requests, the local code characteristics comprise a local start line, a local end line, and local parameters associated with at least one segment of the local source code, determining from the remote source code information remote code characteristics associated with the one or more instrumentation requests, the remote code characteristics comprise a remote start line, a remote end line, and remote parameters associated with at least one segment of the remote source code available to the user, and determining whether the local code characteristics are contained within the remote code characteristics. Determining whether the remote code characteristics are contained within the local code characteristics may include determining whether the remote start line is less than or equal to the local start line, determining whether the remote end line is greater than or equal to the local end line, and determining whether the remote parameters are all included in the local parameters.

Capturing the one or more blocks of the application data may include capturing the one or more blocks of the application data with minimal effect on state data associated with the executing application process.

In some variations, a second software debugging method is provided that includes receiving from a remote device, by an instrumentation agent operating at an application system, an instrumentation request, associated with one or more contextual conditions, for application data resulting from execution of an application process on the application system, with the application process corresponding to source code that includes at least one code segment to capture system data at a first observability level, and with the instrumentation request including information representative of a second observability level, different from the first observability level, to cause adjustment of the first observability level to the second observability level. The second method also includes identifying, by the instrumentation agent, running code segment of the application process corresponding to the at least one code segment of the source code to capture the system data at the first observability level, and modifying the identified running code segment into a modified conditional running code segment configured to capture system data at the adjusted second level of observability upon determination that contextual information, representative of contextual conditions associated with the application system, matches at least some of the one or more contextual conditions associated with the instrumentation request.

Embodiments of the second method may include at least some of the features described in the present disclosure, including at least some of the features described above in relation to the first method, and one or more of the following features.

The instrumentation request may include further information to specify one or more of, for example, location of statements to be adjusted from the first observability level to the second observability level, and/or at least one of the one or more contextual conditions.

The method may further include capturing the system data at the second observability level in response to a determination, when executing the modified conditional running code segment, that the contextual information for the application system matches at least some of the one or more contextual conditions associated with the instrumentation request.

The method may further include capturing the system data at the first observability level in response to a determination, when executing the modified conditional running code segment, that the contextual information does not match the one or more contextual conditions associated with the instrumentation request.

The contextual information may include one or more of, for example, identity information of the executing application process being executed, identity information of one or more users associated with the executing application process, dynamic system characteristics of the application system on which the application process is executing, alerts generated by an alert system of the application system on which the application process is executing, and/or system configuration information.

The one or more contextual conditions may include expiration information specifying a time at which the modified conditional running code segment is disabled or is reverted to an earlier version running code segment configured to capture system data at the first level of observability.

The captured system data at the second level of observability may have a higher data granularity than captured system data at the first level of observability.

The method may further include receiving, by the instrumentation agent, one or more additional instrumentation requests for application data resulting from execution of the application process on the application system, processing the received one or more additional instrumentation requests for application data to generate one or more injection point objects configured to obtain blocks of application data, inserting the one or more injection point objects into the running code of the application process, and capturing one or more blocks of application data resulting from the inserted one or more injection point objects during the execution of the application process without causing stoppage of the execution of the application process. Capturing the one or more blocks of application data resulting from the inserted one or more injection point objects may include dynamically adjusting level of data being captured or outputted based, at least in part, on the current contextual information.

At least one of the injection point objects may include a multi-point injection point object that includes multiple cooperating object parts that are each inserted into one of multiple insertion points of the running code for the application process, with the multi-point injection point configured to capture application data generated from execution of an interval of the running code for the application process bounded by the multiple insertion points into the running code corresponding to the multiple object parts of the multi-point injection point object.

Processing the one or more instrumentation requests to generate the one or more injection point objects may include generating one or more of, for example, a counter injection point object configured to count number of occurrences of a line of code for the executing application process, and/or a trace injection point object to cause capture of trace data for the executing application process.

Processing the one or more instrumentation requests to generate the one or more injection point objects may include generating the script object, including generating a TicToc injection point object comprising a root object and an associated leaf object. Inserting the one or more injection point objects may include inserting the root object into a starting location of a specified section of the running code of the application process, and inserting the leaf object into an end location of the specified section of the running code. Capturing the one or more blocks of application data may include capturing the application data for the executing application process corresponding to the specified section of the running code based on the inserted root object and leaf object.

The application system may include one or more production-environment servers, and the application process may include a production-environment process.

Receiving the instrumentation request for application data may include receiving the instrumentation request from a remote intermediate management server configured to receive control input from a separate remote user terminal, different from the application system, to control the instrumentation agent, with the remote intermediate management server being further configured to control communication between a plurality of deployed instrumentation agents, that include the instrumentation agent at the application system, and a plurality of remote user terminals.

In some variations, a third software debugging method is provided that includes receiving from a remote device, by an instrumentation agent operating at an application system, one or more instrumentation requests for application data resulting from execution of an application process on application system, and processing the received one or more instrumentation requests for application data to generate one or more injection point objects configured to obtain blocks of application data. The processing includes determining local source code information available at the application system for the executing application process, comparing the local source code information to remote source code information, included with the received instrumentation requests, regarding remote source code available to a user interacting remotely with the application system via the remote device, with the remote source code corresponding to the executing application process, and performing one or more actions based on determination of a mismatch or a match between at least some of the local source code information and the remote code source information.

Embodiments of the third method may include at least some of the features described in the present disclosure, including at least some of the features described above in relation to the first and second methods, and one or more of the following features.

Comparing the local source code information to the remote source code information may include comparing local source code versioning information included with the local source code information to remote source code versioning information included with the remote source code information. Performing the one or more actions may include sending a mismatch notification in response to a mismatch between the local source code versioning information and the remote source code versioning information.

The method may further include aggregating information regarding the mismatch between the local source code versioning information and the remote source code versioning information into a global list of versioning mismatch information accessible by a plurality of instrumentation agents operating at the application system.

Comparing the local source code information to the remote source code information may include determining from the local source code information local code characteristics associated with the one or more instrumentation requests, with the local code characteristics comprising a local start line, a local end line, and local parameters associated with at least one segment of the local source code, determining from the remote source code information remote code characteristics associated with the one or more instrumentation requests, with the remote code characteristics comprising a remote start line, a remote end line, and remote parameters associated with at least one segment of the remote source code available to the user, and determining whether the local code characteristics are contained within the remote code characteristics.

Determining whether the remote code characteristics are contained within the local code characteristics may include determining whether the remote start line is less than or equal to the local start line, determining whether the remote end line is greater than or equal to the local end line, and determining whether the remote parameters are all included in the local parameters.

The method may further include inserting the one or more injection point objects into the code of the application process, and capturing one or more blocks of application data resulting from the inserted one or more injection point objects during the execution of the application process without causing stoppage of the execution of the application process and without affecting state data associated with the executing application process, with at least one of the injection point objects including a multi-point injection point object that includes multiple cooperating object parts that are each inserted into one of multiple points of the code for the application process, the multi-point injection point configured to capture application data generated from execution of a segment of the code for the application process bounded by the multiple insertion points of the code corresponding to the multiple object parts of the multi-point injection point object.

Inserting the one or more injection point objects may include inserting a particular one of the one or more injection point objects in response to a determination that the local source code information substantially matches the remote code source information.

Performing the one or more actions may include aborting insertion of a particular injection point object from the one or more injection point objects in response to a determination of a mismatch between the local source code information and the remote code source information associated with the particular injection point object.

The one or more instrumentation requests may include an instrumentation request comprising information to cause adjustment of at least one segment of running code, corresponding to a source code segment for outputting data at a first observability level, into a modified conditional running code segment for outputting the data at a second observability data different from the first observability level.

In some variations, a fourth software debugging method is provided that includes receiving from a remote device, by an instrumentation agent operating at an application system, one or more instrumentation requests for application data resulting from execution of an application process on an application system, generating from the received one or more instrumentation requests for application data one or more injection point objects configured to obtain blocks of application data, determining risk of adverse impact by an injection point object, from the one or more injection point objects, on one or more of, for example, performance of the application system, and/or state of the application system, and processing the injection point object based, at least in part, on the determined risk of adverse impact by the injection point object. The processing includes evaluating the injection point object by the application process in response to a determination that the injection point object is safe for evaluation by the executing application process, evaluating the injection point object by an evaluation process in response to a determination that the injection point object has an uncertain risk of adverse impact, or performing mitigation operations in response to a determination that the injection point object is associated with a high risk of causing adverse impact.

Embodiments of the fourth method may include at least some of the features described in the present disclosure, including at least some of the features described above in relation to the first, the second, and the third methods, and one or more of the following features.

Determining the risk of adverse impact by the injection point object may include comparing one or more portions of the injection point object to lists containing portions of at least some injection point objects, each of the lists being associated with a respective risk level representative of the risk of adverse impact on the application system by expressions within the respective each of the lists.

The lists may include a safe list that includes injection point object portions determined to be safe to execute by application processes on the application system, and an unsafe list that includes other injection point object portions determined to be unsafe to execute application processes on the application system.

Processing the injection point object may include evaluating, in response to a determination that all portions of the injection point object are included in the safe list, the injection point object within the application process, aborting, in response to a determination that a portion of the injection point object is included in the unsafe list, execution of the injection point object, or evaluating, in response to a determination that at least one portion of the evaluated injection point object is not included in the safe list or the unsafe list, the injection point object within the evaluation process.

Evaluating the injection point object within the evaluation process may include computing output resulting from execution of the injection point object within the evaluation process.

The at least one portion of the injection point object may include a function or procedure call not included in any of the lists, and processing the injection point object may further include invoking, upon reaching the function or procedure call not included in any of the lists, another instance of evaluation process to evaluate the function or procedure call not included in any of the lists, and returning, upon completing evaluation of the function or procedure call on the other instance of the evaluation process, to a first instance of the evaluation process to resume execution of the injection point object being evaluated.

The evaluation process may be implemented as an interpreter for the injection point object being evaluated.

Performing the mitigation operations in response to the determination that the injection point object is associated with a high risk of causing adverse impact may include aborting execution of the injection point object.

At least one of the injection point objects may include a multi-point injection point object that includes multiple cooperating object parts that are each inserted into one of multiple points of a code representation for the application process, the multi-point injection point being configured to capture application data generated from execution of a segment of the code representation for the application process bounded by the multiple insertion points of the code representation corresponding to the multiple object parts of the multi-point injection point object.

The one or more instrumentation requests may include an instrumentation request comprising information to cause adjustment of at least one segment of running code, corresponding to a source code segment for outputting data at a first observability level, into a modified conditional running code segment for outputting the data at a second observability data different from the first observability level.

In some variations, a first system for software debugging is provided that includes one or more application servers including one or more memory storage devices to store programmable instructions, and one or more processing-based devices coupled to the one or more memory storage devices. The one or more application servers are configured to execute at least one instance of an application process represented by code stored on the one or more memory storage devices, and to receive from a remote device one or more instrumentation requests for application data resulting from execution of the at least one instance of the application process on the one or more application servers, process the received one or more instrumentation requests for application data to generate one or more injection point objects, with the generated one or more injection point objects configured to obtain one or more blocks of application data, insert the one or more injection point objects into code of the at least one instance of the application process, and capture the one or more blocks of application data resulting from the inserted one or more injection point objects during the execution of the at least one instance of the application process without causing the stoppage of the execution of the at least one instance of the application process. At least one of the one or more injection point objects includes a multi-point injection point object that includes multiple cooperating object parts that are each inserted into one of multiple insertion points of the code for the at least one instance of the application process, the multi-point injection point configured to capture application data generated from execution of a segment of the code for the at least one instance of the application process bounded by the multiple insertion points of the code corresponding to the multiple object parts of the multi-point injection point object.

In some variations, a first non-transitory computer-readable media is provided that includes computer instructions executable on one or more processor-based devices to receive from a remote device, by an instrumentation agent operating at an application system, one or more instrumentation requests for application data resulting from execution of an application process on the application system, process the received one or more instrumentation requests for application data to generate one or more injection point objects configured to obtain blocks of application data, insert the one or more injection point objects into the code of the application process, and capture one or more blocks of application data resulting from the inserted one or more injection point objects during the execution of the application process without causing stoppage of the execution of the application process. At least one of the injection point objects includes a multi-point injection point object that includes multiple cooperating object parts that are each inserted into one of multiple points of the code for the application process, the multi-point injection point configured to capture application data generated from execution of a segment of the code for the application process bounded by the multiple insertion points of the code corresponding to the multiple object parts of the multi-point injection point object.

In some variations, a second system is provided that includes one or more application servers comprising one or more memory storage devices to store programmable instructions, and one or more processing-based devices coupled to the one or more memory storage devices. The one or more application servers are configured to execute at least one instance of an application process represented by code stored on the one or more memory storage devices, and to receive from a remote device an instrumentation request, associated with one or more contextual conditions, for application data resulting from execution of the at least one instance of the application process on the one or more application servers, with the at least one instance of the application process corresponding to source code that includes at least one code segment to capture system data at a first observability level, and with the instrumentation request including information representative of a second observability level, different from the first observability level, to cause adjustment of the first observability level in the source code to the second observability level. The one or more application servers are further configured to identify running code segment of the at least one instance of the application process corresponding to the at least one code segment of the source code to capture the system data at the first observability level, and modify the identified running code segment into a modified conditional running code segment configured to capture system data at the adjusted second level of observability upon determination that contextual information, representative of contextual conditions associated with the one or more application servers, matches at least some of the one or more contextual conditions associated with the instrumentation request.

In some variations, a second non-transitory computer-readable media is provided that includes computer instructions executable on one or more processor-based devices to receive from a remote device, by an instrumentation agent operating at an application system, an instrumentation request, associated with one or more contextual conditions, for application data resulting from execution of an application process on the application system, with the application process corresponding to source code that includes at least one code segment to capture system data at a first observability level, and with the instrumentation request including information representative of a second observability level, different from the first observability level, to cause adjustment of the first observability level to the second observability level. The instructions are also configured to, when executed, identify, by the instrumentation agent, running code segment of the application process corresponding to the at least one code segment of the source code to capture the system data at the first observability level, and modify the identified running code segment into a modified conditional running code segment configured to capture system data at the adjusted second level of observability upon determination that contextual information, representative of contextual conditions associated with the application system, matches at least some of the one or more contextual conditions associated with the instrumentation request.

In some variations, a third system is provided that includes one or more application servers comprising one or more memory storage devices to store programmable instructions, and one or more processing-based devices coupled to the one or more memory storage devices. The one or more application servers are configured to execute at least one instance of an application process represented by code stored on the one or more memory storage devices, and to receive from a remote device one or more instrumentation requests for application data resulting from execution of the at least one instance of the application process on the one or more application servers, and process the received one or more instrumentation requests for application data to generate one or more injection point objects configured to obtain blocks of application data. The one or more application servers configured to process the one or more instrumentation requests are configured to determine local source code information available at the one or more application servers for the executing at least one instance of the application process, compare the local source code information to remote source code information, included with the received instrumentation requests, regarding remote source code available to a user interacting remotely with the one or more application servers via the remote device, with the remote source code corresponding to the executing at least one instance of the application process, and perform one or more actions based on determination of a mismatch or a match between at least some of the local source code information and the remote code source information.

In some variations, a third non-transitory computer-readable media is provided that includes computer instructions executable on one or more processor-based devices to receive from a remote device, by an instrumentation agent operating at an application system, one or more instrumentation requests for application data resulting from execution of an application process on the application system, and process the received one or more instrumentation requests for application data to generate one or more injection point objects configured to obtain blocks of application data. The instructions to process the one or more instrumentations requests include one or more instructions to determine local source code information available at the application system for the executing application process, compare the local source code information to remote source code information, included with the received instrumentation requests, regarding remote source code available to a user interacting remotely with the application system via the remote device, the remote source code corresponding to the executing application process, and perform one or more actions based on determination of a mismatch or a match between at least some of the local source code information and the remote code source information.

In some variations, a fourth system is provided that includes one or more application servers comprising one or more memory storage devices to store programmable instructions, and one or more processing-based devices coupled to the one or more memory storage devices. The one or more application servers are configured to execute at least one instance of an application process represented by code stored on the one or more memory storage devices, and to receive from a remote device one or more instrumentation requests for application data resulting from execution of the at least one instance of the application process on the one or more application servers, generate from the received one or more instrumentation requests for application data one or more injection point objects configured to obtain blocks of application data, and determine risk of adverse impact by an injection point object, from the one or more injection point objects, on one or more of, for example, performance of the one or more application servers, and/or state of the one or more application servers. The one or more application servers are further configured to process the injection point object based, at least in part, on the determined risk of adverse impact by the injection point object, including to evaluate the injection point object by the at least one instance of the application process in response to a determination that the injection point object is safe for evaluation by the executing at least one instance of the application process, evaluate the injection point object by an evaluation process in response to a determination that the injection point object has an uncertain risk of adverse impact, or perform mitigation operations in response to a determination that the injection point object is associated with a high risk of causing adverse impact.

In some variations, a fourth non-transitory computer-readable media is provided that includes computer instructions executable on one or more processor-based devices to receive from a remote device, by an instrumentation agent operating at an application system, one or more instrumentation requests for application data resulting from execution of an application process on the application system, generate from the received one or more instrumentation requests for application data one or more injection point objects configured to obtain blocks of application data, determine risk of adverse impact by an injection point object, from the one or more injection point objects, on one or more of, for example, performance of the application system, and/or state of the application system, and process the injection point object based, at least in part, on the determined risk of adverse impact by the injection point object. The instructions to process the injection point object include one or more instructions to evaluate the injection point object by the application process in response to a determination that the injection point object is safe for evaluation by the executing application process, evaluate the injection point object by an evaluation process in response to a determination that the injection point object has an uncertain risk of adverse impact, or perform mitigation operations in response to a determination that the injection point object is associated with a high risk of causing adverse impact.

Embodiments of the various systems and computer-readable media above may include at least some of the features described in the present disclosure, including at least some of the features described above in relation to the first, the second, the third, and the fourth methods.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Figure 1:
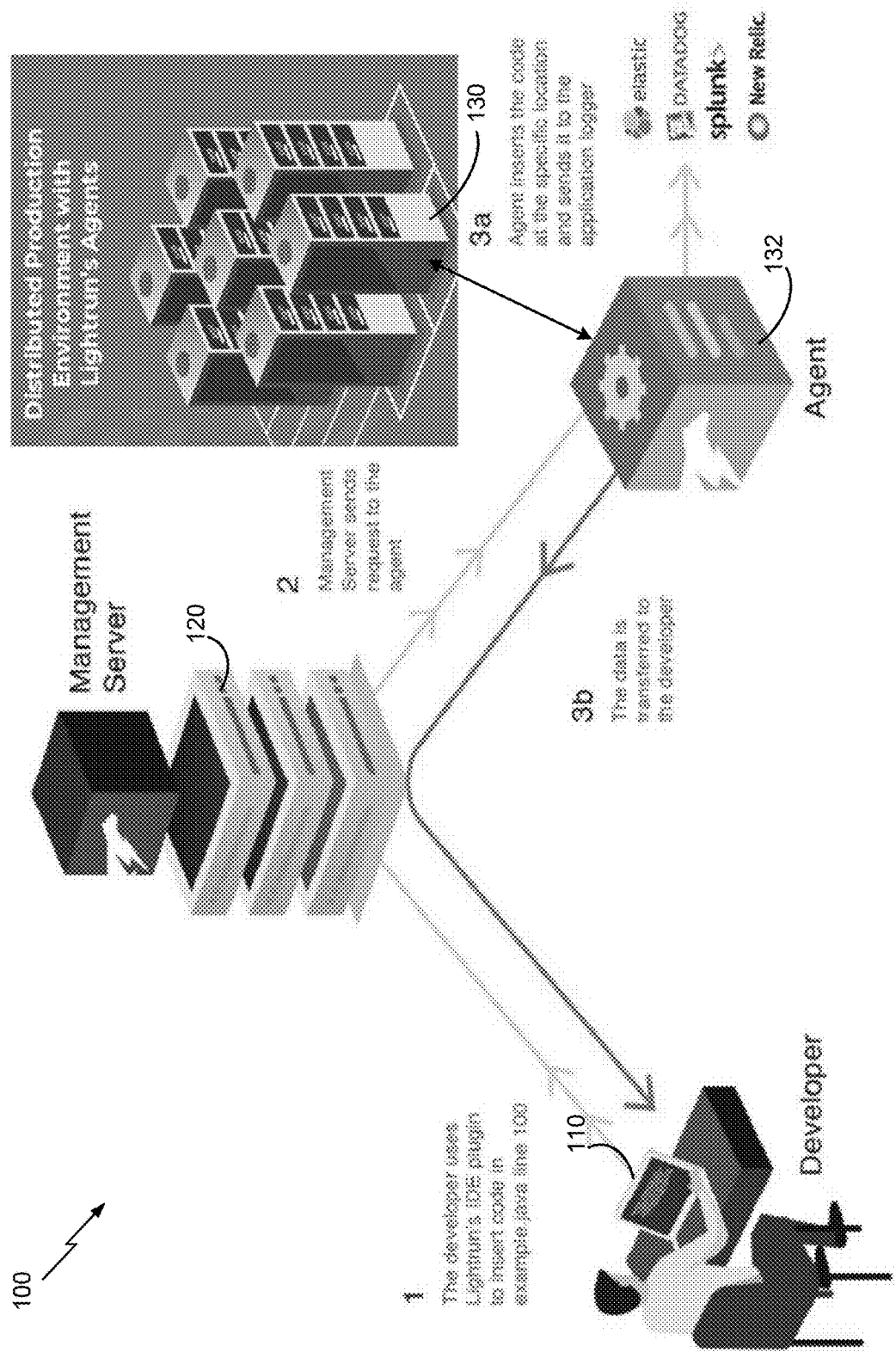
FIG. 1 is a diagram of an example system to implement debugging processes.

The present disclosure describes implementations to dynamically insert injection point objects into code (e.g., executable code, in the form of bytecode) of an application process without halting execution of, generally, a production environment process, and with minimal impact on the machine state of the computing platform on which an application process being monitored is running (be it as a bytecode or as an executable). At least one of the injection point objects that are generated and inserted to facilitate application development and debugging procedure may be a script-based, multi-point injection point object, that is configured to monitor and respond to program flows within bounded segments (corresponding to multi-lines of source code segments of source code corresponding to a bytecodes or executables generated from the source code). An example of such multi-point script object is the TicToc object discussed below in greater detail.

The application development and debugging platforms described herein are also configured, in some embodiments, to implement adaptive/dynamic observability that allows a developer (via the instrumentation agent attached to a running process) to change the granularity level of existing logs (and/or other types of data output) that are outputted by the executing application process based on existing context conditions (e.g., which user or company is associated with the specific application process instance being handled, existence of specific machine state conditions, etc.) For example, code lines for the running process (e.g., code lines of the bytecode) can be modified to turn output commands/instructions into conditional commands/instructions that produce reduced or heightened level of output depending on whether the modified conditional output command satisfy the specific contextual conditions specified by the developer. For example, the developer can specify that log level data be produced when an instance of the application process associated with a particular user is being managed (e.g., for userId==17 print log level DEBUG). Dynamic observability can be implemented through the specification (e.g., at the user terminal, via the user interface available at the remote user terminal) of conditions and parameters that define the situations and circumstances under which specific granularity level of data captures are provided. Additionally, in some embodiments, the level of observability can also be controllably adjusted through injection point objects. In such embodiments, the injection point objects that are used in conjunction with the program monitoring and observation procedures may implement observability functionality that adapts the level of output data (e.g., log data) obtained based on dynamic conditions of the system and program flow.

As will also become apparent below, implementations of the solutions and approaches described herein may also include the use of an evaluation/testing process (referred to as a "sandbox") that can be invoked from the running application process being monitored and debugged in order to evaluate the behavior of injection point objects and their effects on the machine state of the systems. Within the sandbox, the injection script of the objects can be run in a type of a virtual bubble that imposes some constraints and restrictions on the objects' execution to protect the application process and the application system (e.g., the objects can generally read only from external state). The running application process can thus be insulated from the deleterious effects that the injection point object(s), being run from the testing process, may have on the running application process and/or on the application system. In some implementations, the sandbox evaluation process is configured to initially check injection point objects to determine whether the script of the object is safe (e.g., if similar code or script has previously been executed without adversely affecting a running process or the system, or the injection point object meets certain safety criteria such as having read-only statements) or unsafe (e.g., at least some part of the object's script is known to have the potential to cause harm, for example to change the state or the flow). If the code does not include any portion (script lines) that are known a priori to be dangerous or risky, but there is at least a portion of the object's code whose impact on the process or system is unknown (e.g., a function call whose resultant effect or output is not known), the sandbox (invoked testing process) will then execute the injection point object a portion at a time.

General Architecture and Multi-Point Injection Objects

FIG. 1 is a diagram of an example system 100 to implement debugging and application development processes, e.g., in a production-environment. While the example embodiments of FIG. 1 are described in relation to production environment debugging processes, the description provided herein equally applies to any other type of computing environment. It is also to be noted that the implementations described herein can be realized for any programming language, including Java, Python, Nodejs, GO, and so on.

The system 100 includes a developer station 110, which is one of multiple developer stations, that can bi-directionally communicate with a management server 120. The station 110 implements an integrated development (or debugging) environment (IDE), which in some embodiments may be a plugin to a network communication application (e.g., a browser). The management server 120, also referred to as an intermediate management server, acts as intermediary between the developers and the application (production-environment) servers, so that a developer does not have direct access to the production-environment. Rather, any access to a production environment (or some other type of computing environment) is carefully mediated and regulated by the management server. Furthermore, the inclusion of an intermediary server, such as the server 120, simplifies the deployment and connectivity architecture for establishing connections from developers' stations to the production environment since it reduces (potentially to one) the number of communication links/connections to the production environment. As a result, a simpler security configuration (comprising one or more links established between the intermediary management server and the application server) can be used (because fewer firewall ports need to be opened).

The management server 120 is configured to interact with the production environment and thus to generate the debugging requests (e.g., in the form of instrumentation requests, also referred to as "injection point requests") that are communicated to an agent (namely, an instrumentation agent to process the requests and generate injection points for insertion into code of the production environment application to be debugged or to be otherwise monitored) according to debugging instructions received from the developers. The management server 120 sends the instrumentation requests to the production-environment servers(s), such as a production-environment server 130. The management server can also control various security features of the system 100.

As noted, communication between the management server 120 and to the production-environment server 130 is facilitated via an instrumentation agent (also referred to as a "debugging agent"), such as instrumentation agent 132 depicted schematically in FIG. 1, hosted on the production-environment server 130. Among some of its functions, the instrumentation agent is configured to receive from the intermediate management server 120 one or more instrumentation requests, and to generate, based on those requests, injection point objects that are to be inserted into code (e.g., bytecode) associated with an application process (such as a production-environment process). It should be noted that in some embodiments, the injection points generated by the agent may be substantially similar, in formatting and configuration, to the received instrumentation requests (although the agent typically would perform testing and vetting on such objects, thus confirming the objects are suitable for injection/insertion into the code). In alternative embodiments, the injection point objects may be of a different format or configuration than the requests received, particularly in situations where the received requests produces generic or uniform requests, providing a description of the tasks that need to be performed in a standard syntax that can be processed by different types of instrumentation agents (e.g., each compatible with different production environment), and the agents are then configured to, among other things, to transform the received generic/uniform requests to specific injection point objects compatible with the specific production environment to which the agent is attached. The instrumentation agents may also be configured to modify actual running code to, for example, convert unconditional data captures into conditional statements (that depend on contextual conditions).

As the application process is executed, the injection point objects inserted into the code of the process cause application data to be captured without causing stoppage of execution of the application process, and with minimally (if it all) affecting the state data associated with the executing production environment process. Captured data (e.g., application data, such as process state snapshots, performance data and metrics, logic data, traces, and any other type of data computed or generated by the application server) can then be communicated back to the intermediate management server 120, and from there back to the developer station 110.

More particularly, the instrumentation agent implements a process that allows developers to create snapshots, loglines, and metrics without impacting the production-environment application's performance or stability. At a high level, injection point objects occur in user threads (this way they capture the real application data). In some embodiments, the instrumentation agent 132 may be configured to add several more threads in order to orchestrate its operation (communication, error reporting, etc.) Communication with the server is done by long-polling, which means that the server 130 does not answer the request until there is news to report to the agent (or, in some situations, some pre-determined timeout point, such as 30 seconds, is reached). The agent checks which injection point objects should be inserted, and which should be removed (e.g., by comparing IDs), and acts accordingly.

In addition to minimizing the impact on the application performance, the instrumentation agent is also configured to avoid or minimize its effect on the application's state (and/or the system's state) during execution. To that end, and as will be discussed in greater detail below, the instrumentation agent is configured to execute and analyze the functions included in a condition and expression, and determine if they have any potential side effects (e.g., through an implementation that includes an interpreter, such as Java language interpreter, or any other programming language interpreter). This capability allows developers to insert new logic to a live system, and to verify that the new logic has no side effects on the execution and states of the processes and the application system. Potential injection point objects that cause excessive adverse effects (or any adverse effect) on the state data for the application process or system) can therefore be identified, and discarded during runtime. This feature (also referred to as a "sandbox") can thus maintain the integrity of the running server and validate there are no side effects on the original state of the application. The sandbox can evaluate the code and can prevent or inhibit writes to an external state. For example, executing code that changes a member of a class will be considered as a side effect, but creating and writing into a temporary variable will not.

Examples of injections points that can be managed by the instrumentation agent include the snapshot injection point object and the log print injection point object. The snapshot injection point object (configured to cause a state data snapshot for the running application) is configured to not stop the application, and to minimize the footprint of a single capture. Thus, for example, implementations of a snapshot injection point may be configured to cap data collected from the snapshot at, for example, 64 KB, and/or to automatically remove snapshots if they use more than some threshold CPU processing capacity (e.g., more than 1% of CPU time on a particular instance of an application). A log print injection point is similar to inserting an additional log line into the code while skipping the CI/CD process, and so it is important that there would be some guarantee that services performance would not be negatively affected by adding them to the code of the application. In some examples, a log print injection point object may be capped at some threshold statement number (e.g., 1024 logs statements per second per instance), and that the obtained data be restricted to, for example, 10 KB of logged data per second per instance.

One type of injection point object that is generated by the instrumentation agent 132 is a script action object (also referred to as a command action, a script object, or a script injection command), which forms the basis for other features, such as a Counter object, a TicToc object, a trace object, etc., which are injection objects configured to cause the capture of various metrics (these object types will be discussed in greater detail below). Some script objects may include multi-point objects with multiple cooperating object parts (i.e., the script parts define a coordinated action or process) that are each inserted into respective ones of multiple points of the code for the application process (an object part can be a script line of code). Multi-point script injection points are configured to capture application data generated from execution of a segment of the code for the application process bounded by the multiple insertion points of the code corresponding to the multiple object parts of the multi-point injection point object. In some embodiments, other types of injection point objects (including snapshot objects and log objects) may also be multi-point objects (e.g., spanning several bytecode statements).

Generally, a script object can include three (3) steps in its life cycle: setup step, expressions (live) step, and teardown step. These steps can exist in other injection point objects (such as snapshot or log print objects). The setup step is where all preparations are made before the injection point object enters its Live phase. The setup step (phase) must be completed in order for the Live (or teardown) phases can commence. This step includes initialization and preparation of various data structures that are needed for the live step.

The live phase is the phase where all the expressions/functions that were assigned to an injection point object (command) are called. Each time the injection point object is hit, the expressions are evaluated and executed. Some of the expressions that are evaluated may be bound to the same limitations as the Log and Snapshot objects, and as such are configured to be read-only operations, generally without changing an executing application's state (or minimally affecting the application's state). The exception cases are what make the script (command) object what it is. As a non-limiting example, scripts can be implemented that write and read from a dedicated expression shared storage.

After an injection point object is determined to be terminated (as determined by the agent or the end user), the injection point object is pushed to a teardown queue. In its turn, each injection point object in the teardown queue is popped out, and its teardown scripts/expressions are evaluated and executed, and/or removed. The teardown phase can execute only if the setup phase had first executed and completed.

The shared storage is a shared memory area that different injection objects can read from and write to in order to implement the capture of certain application data (such as metrics that are obtained via the TicToc and/or Counter objects). When script elements are injected into code, those script elements can share information one with another, and thus such script elements can define dependencies between different injection points. In some examples, the mechanism/structure used to enforce the dependencies between script elements can be defined using a tree structure/notation.

TicToc and Counter objects are both implemented using a script object. During their setup phase, their storage is prepared and initialized. In the teardown phase, that storage is cleaned up. Both TicToc and Counter output metrics can produce the following statistics: sample count, min, max, mean, stddev (standard deviation), and a histogram.

The counter object, implemented via the command action, keeps count on how many times a line of code was hit during its lifetime. The count is stored per application thread which gives more information about the execution of the code and enables a lock free implementation of the counter object. A TicToc object (which is a type of multi-insertion point script object) is a performance tool (object) and can be used to, for example, measure the duration of a code snippet or an entire program method/procedure.

The TicToc object, which comprises two or more injection object parts, and can be thought of (and realized) as a tree structure defining an order of execution, and managing the execution, and later the de-activation, of the individual object parts within the object (the individual parts constitute an object group). For example, the grouping of objects in the tree can allow all injection object parts within the injection tree object to be collectively de-activated (i.e., if one part of the tree is deactivated, the other parts also become de-activated). An injection object tree includes a root (for example, a Tic injection) and one or more leaves (for example, a Toc injection). The tree guarantees that a leaf injection point object part can only be called if it follows a root call. In an injection tree, a root object is called first, followed by a child object (the lead). In a tree structure, a branch (i.e., a tree branch, defining a path from a root to a leaf) should be run from a root object to the child (leaf object) without interrupts. This means that two sequential calls to leaf injection point objects are not allowed, and every injection point object part hit on a leaf that does not follow a root call will, in some examples, be discarded. These properties apply to hits that happened in the same thread, so two leaf hits from two different threads can be applied if both had root hits before, each in its own thread. Using that mechanism, very complex logic and data collectors, such as the TicToc script injection point object, can be implemented.

A duration is measured between a Tic and a Toc that occurred in the same thread. A timestamp object is stored on occurrence of a Tic hit, and a sample is calculated when a Toc hit occurs. When the TicToc injection point object is applied to a selection of a code snippet, two injection point objects are inserted, one at the beginning of the selection and one at the end. In some examples, when the TicToc is inserted without a selection of code, it is applied to the whole method automatically—one at the beginning of the method, and, generally, one at every return statement or throw statement in between them (there may be several exit points).

In some embodiments, the instrumentation agent is also configured to implement tracing. OpenTracing is a standardized API that describes how to structure tracing information within a distributed system environment, and how requests can cross process boundaries. Span objects, which are similar to logs but with a defined structure, can also be implemented by the instrumentation agent. The instrumentation agent described herein allows users to define new spans and to add tags to existing spans. Tracing implementations may be realized using the script objects (command action) described herein.

The user interface would generally be invoked on a user station, such as the station 110 depicted in FIG. 1, to allow the user to provide instructions/commands that are forwarded to the intermediary server 120 configured to generate instrumentation requests that incorporate the trigger rule specifications provided by the user at the station 110. As noted, the instrumentation requests are communicated to an instrumentation agent/s (such as the agent 132 of FIG. 1), which in turn processes the request to, inter alia, generate the corresponding injection point objects (optionally with testing and appropriate modifications performed by the sandbox feature of the system) that are added to the code (e.g., to a running code, such as bytecode, or into the source code).

Figure 2:
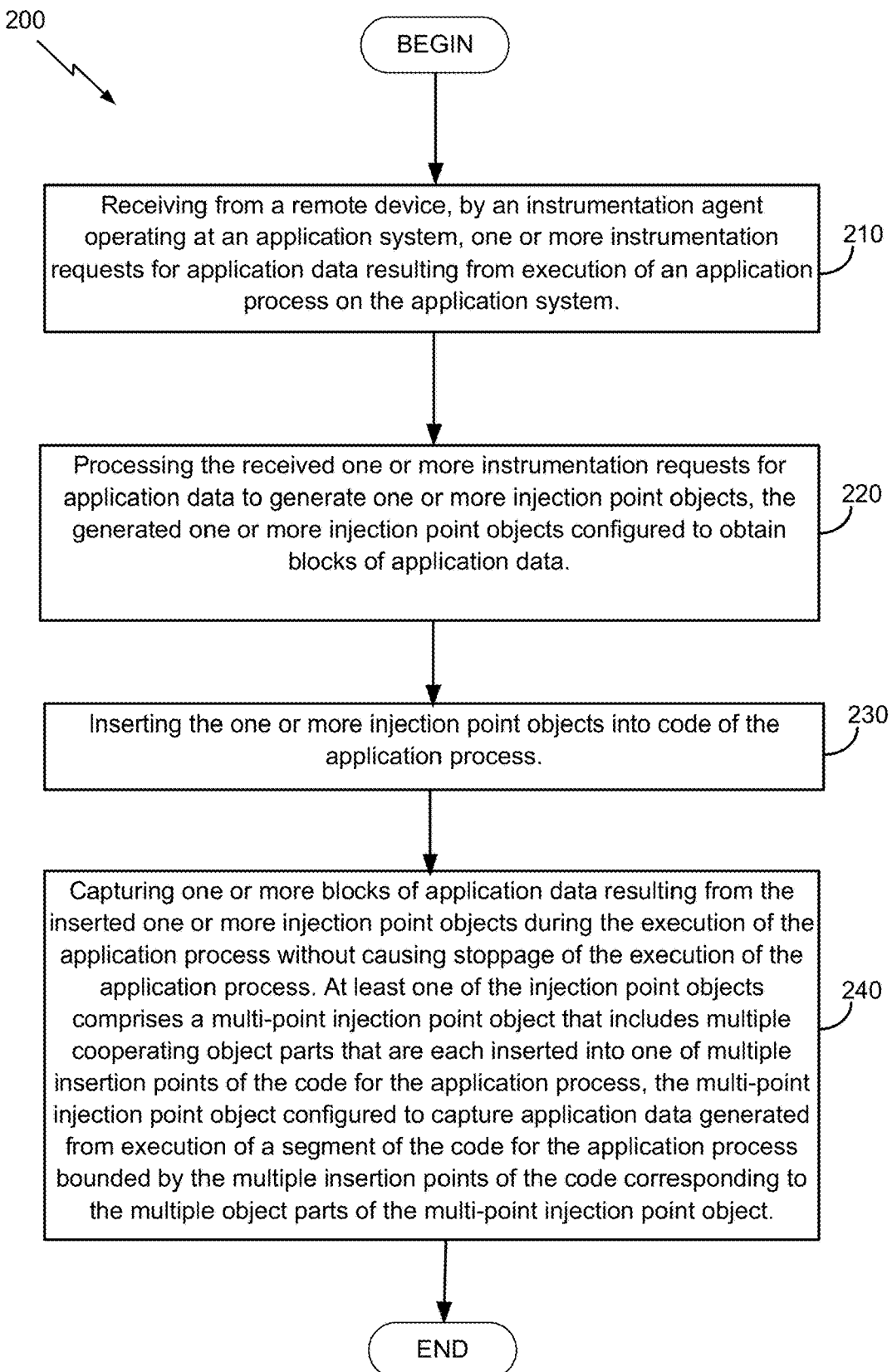
FIG. 2 is a flowchart of an example debugging procedure, generally performed with an instrumentation agent.

With reference now to FIG. 2, a flowchart of an example application development and debugging procedure 200, generally performed with an instrumentation agent such as the agent 132 of FIG. 1, is shown. The procedure usually begins when agents (such as the agent 132) attach to various application processes across an application server (such as the servers 130). As shown in FIG. 2, the procedure 200 includes receiving 210 from a remote device (e.g., the remote intermediate management server 120), by an instrumentation agent operating at an application system, one or more instrumentation requests for application data resulting from execution of an application process on the application system. In some examples, receiving the one or more instrumentation requests for application data from the remote device may include receiving the one or more instrumentation requests from a remote intermediate management server (e.g., the server 120) configured to receive control input from a separate remote user terminal (e.g., the station 110 of FIG. 1), different from the application system, to control the instrumentation agent. The remote intermediate management server is further configured to control communication between a plurality of deployed instrumentation agents, that include the instrumentation agent at the application system, and a plurality of remote user terminals.

The procedure 200 further includes processing 220 the received one or more instrumentation requests for application data to generate one or more injection point objects. The generated one or more injection point objects are configured to obtain blocks of application data. The processing may also implement, for example, functionality such as error reporting (e.g., report that "there is no line 100 in file xyz.java), injection point object validation, etc.

In some examples, processing the one or more requests may include generating one or more of, for example, a snapshot injection point object configured to capture state data associated with the executing application process, a log print injection point object, and/or other types of objects (such as the script objects described herein).

In embodiments in which a script object is generated (be it a multi-part object, or otherwise), the script object may be configured to perform write operations into a dedicated memory area for the instrumentation agent shared by script injection point objects. Script objects generally allow coding any logic and define any metric that a user may want or need to collect. Examples of such script objects include the TicToc script injection point object, the counter script injection point object, etc.

Generating the script object may include generating a counter script injection point object configured to count number of occurrences of a line of code for the executing application process. In some other examples, generating the script object may include generating a trace script injection point object to cause capture of trace data for the executing application process. In yet other examples, generating the script object may include generating a TicToc script injection point object comprising a root object (Tic) and an associated leaf (Toc) object.

With continued reference to FIG. 2, the procedure 200 additionally includes inserting 230 the one or more injection point objects into code (e.g., bytecode) of the application process. In examples in which the injection point object to be inserted is a TicToc script (command) injection point object, the inserting may include inserting the root object into a starting location of a specified location (or a derived location) of the code of the application process, and inserting the leaf object into an end location of the specified section of the code. The procedure 200 may also include, in situations in which root and leaf object parts have been inserted, determining that two sequentially encountered script injection point objects are both leaf objects, and discarding a second of the two sequentially encountered leaf objects.

As further depicted in FIG. 2, the procedure 200 also includes capturing 240 one or more blocks of application data resulting from the inserted one or more injection point objects during the execution of the application process without causing stoppage of the execution of the application process. At least one of the injection point objects include a multi-point injection point object (e.g., a script object, like TicToc or counter objects, or some other type of injection point object, such as a snapshot or log object) that includes multiple cooperating object parts that are each inserted into a respective one of multiple points of the code for the application process, with the multi-point injection point object configured to capture application data generated from execution of a segment of the code for the application process bounded by the multiple insertion points of the code corresponding to the multiple object parts of the multi-point injection point object. In some embodiments, the inserted injection point objects are configured to cause minimal change to the state data associated with the executing process (and preferably to capture data without affecting the state data associated with the executing application process). In examples in which a script object includes a TicToc script object (with root and leaf elements defining a tree structure), capturing the one or more blocks of application data comprises capturing the application data for the executing application process corresponding to the specified section of the code based on the inserted root object and leaf object.

In some embodiments, capturing the one or more blocks of application data may include determining level of server resources usage during execution of the production environment process, and capturing a block of application data in response to a determination that the level of computing resource usage is below a pre-determined resource threshold. The computing resource usage may include one or more of, for example, CPU usage for processing captured application data, storage resources for the captured application data, and/or transmission resources to communicate the captured application data to the instrumentation agent.

In some situations (e.g., for script objects, which may be multi-part script objects), capturing the application data for the executing application process may include obtaining statistical information associated with occurrences of samples for a particular object, including one or more of, for example, number of the occurrences of the samples, minimum duration length of a first sample from the occurrences of the samples, maximum duration length of a second sample from the occurrences of the samples, mean duration of the samples, standard deviation of durations of the samples, and/or a histogram of the durations of the samples.

In some examples, the procedure 200 may further include attaching the instrumentation agent to one or more (in some situations, all) application processes executing on the application system (to thus cause the agent 132, or agents like it, to be included in every application process).

As will be discussed in greater detail below, the approaches described herein may implement adaptive (dynamic) observability. In such embodiments, the one or more instrumentation requests may include an instrumentation request(s) comprising information to cause adjustment of at least one segment of running code, corresponding to a source code segment for outputting data (e.g., output log data, snapshots, performance metric data, etc.) at a first observability level, into a modified conditional running code segment for outputting the data at a second observability data different from the first observability level. In such embodiments, the instrumentation request may further include information to specify one or more of, for example, location (e.g., in the source code, or optionally in an already running bytecode) of statements to be adjusted from the first observability level to the second observability level, and one or more contextual conditions to trigger the modified conditional running code.

The implementations for the dynamic observability also include identifying, by the instrumentation agent, the at least one segment of running code for the application process for outputting data at a first observability level, and modifying the identified at least one segment of running code into a modified conditional running code segment configured to output the data at the adjusted second level of observability upon determination that contextual information, representative of contextual conditions associated with the application system, matches at least some of the one or more contextual conditions included with the instrumentation request. In some implementations, identification of the location of the statement to be modified may be performed by translating into a bytecode statement a source code statement with the output data statement to be modified from the first to the second level of observability, and finding in the running bytecode (corresponding to the source code) a statement substantially matching the translated statement.

The contextual information, based on which a determination is made of whether the modified conditional running code segment is to be triggered, may include one or more of, for example, identity information of the executing application process being executed, identity information of one or more users associated with the executing application process, dynamic system characteristics of the application system on which the application process is executing, alerts generated by an alert system of the application system on which the application process is executing, and/or system configuration information.

Another feature that is discussed in greater detail below is the sandbox feature in which an evaluation process tests/evaluates the impact injection point objects have on performance of the application process and/or its state (or that of the system). In such embodiments, a procedure such as the procedure 200 may further include determining risk of adverse impact by an injection point object, from the one or more injection point objects, on one or more of, for example, performance of the application system, or state of the application system, and processing the injection point object based, at least in part, on the determined risk of adverse impact by the injection point object. Such processing may include evaluating the injection point object by the application process in response to a determination that the injection point object is safe for evaluation by the executing application process, evaluating the injection point object by an evaluation process in response to a determination that the injection point object has an uncertain risk of adverse impact, or performing mitigation operations in response to a determination that the injection point object is associated with a high risk of causing adverse impact (such mitigation operations may include, for example, aborting execution of the injection point object, sending a notification that the at least one injection point object is not safe, etc.)

In some examples, the evaluation process may be implemented as an interpreter for the injection point object being evaluated. In some embodiments, determining the risk of adverse impact by the injection point object may include comparing one or more portions of the injection point object to lists containing portions of at least some statements and expressions (e.g., of injection point objects) that are defined or are known (e.g., based on previous evaluation of injection point objects or particular statement) to be associated with a respective risk level (e.g., safe or unsafe) representative of the risk of adverse impact on the application system by expressions within the respective each of the lists. Examples of such lists include a safe list (also referred to as a white list) that includes injection point object portions determined to be safe to execute by application processes on the application system, and an unsafe list (also referred to as a black list) that includes other injection point object portions (or whole injection point objects) determined to be unsafe to execute application processes on the application system. In some embodiments, additional lists may also be included, for example, a gray list, that includes statements with an uncertain or unknown level of risk to have potential adverse impact on the application system and/or the application state. It should be noted that, in some examples, a white list might contain only statements (e.g., parts or wholes of injection point objects) that are always safe, and might exclude, under such circumstances, statements or objects that may have been evaluated to be safe for a particular execution of the statement/object, but may not be safe when executed at some future point (for the same or different instance of an application process). That is, an injection point dynamically determined to be safe (i.e., for a particular evaluation) does not guarantee that the same injection point (or a statement/expression therein) would be safe the next time. Under such circumstances, the white list may thus include only "always safe" statements or objects.

In some embodiments, processing the injection point object may include, a) in response to a determination that all portions of the injection point object are included in the safe list, evaluating the injection point object within the application process, b) in response to a determination that a portion of the injection point object is included in the unsafe list, aborting execution of the injection point object, and c) in response to a determination that at least one portion of the evaluated injection point object is not included in the safe list or the unsafe list, evaluating the injection point object within the evaluation process. Generally, every method call within an injection point object will be tested according to this example three-state logic.

In some implementations, the procedure 200 may also implement a source validation feature (also discussed in greater detail below). In such implementations, processing the received one or more instrumentation requests may include determining local source code information available at the application system for the executing application process, comparing the local source code information to remote source code information, included with the received instrumentation requests, regarding remote source code available to a user interacting remotely with the application system via the remote device (with the remote source code corresponding to the executing application process), and performing one or more actions in response to a determination of a mismatch or a match between at least some of the local source code information and the remote code source information. Comparing the local source code information to the remote source code information may include comparing local source code versioning information included with the local source code information to remote source code versioning information included with the remote source code information. Performing the one or more actions may include sending a mismatch notification in response to a mismatch between the local source code versioning information and the remote source code versioning information. The procedure may additionally include aggregating information regarding the mismatch between the local source code versioning information and the remote source code versioning information into a global list of versioning mismatch information accessible by a plurality of instrumentation agents operating at the application system.

In some examples, comparing the local source code information to the remote source code information may include determining from the local source code information local code characteristics associated with the one or more instrumentation requests, with the local code characteristics including local start line, local end line, and local parameters associated with at least one segment of the local source code. The comparing operations also include determining from the remote source code information remote code characteristics associated with the one or more instrumentation requests, with the remote code characteristics including a remote start line, a remote end line, and remote parameters associated with at least one segment of the remote source code available to the user, and determining whether the local code characteristics are contained within the remote code characteristics. Determining whether the remote code characteristics are contained within the local code characteristics may include determining whether the remote start line is less than or equal to the local start line, determining whether the remote end line is greater than or equal to the local end line, and determining whether the remote parameters are all included in the local parameters.

Adaptive Observability

In some embodiments, the efficiency of the debugging and application development frameworks described herein can be improved by adaptively adjusting the level of information that is being captured (retained/observed) by the system, or that is being outputted, based on one or more dynamic contextual criteria. For example, the log data level to preserve or to be outputted can be adjusted for specific users, or can be adjusted in response to the existence of certain conditions (e.g., detected slowdown of the executing process, an increase in the error rate for the system or for a particular thread or process, etc.)

For example, due to the proliferation of SAAS (software-as-a-service) solutions, more users and entities (companies) consume $3^{rd}$-party SAAS solutions to address those users/entities needs, and likewise provide their solutions via an SAAS platform. Consequently, in a complex multi-tenant SAAS world, software development (including debugging) requires more nuanced collection of log data, e.g., at different granularity levels depending on specific contextual conditions. Consider, by way of illustration, the following, scenarios:

1) There is a specific user/tenant that has a bug. It is preferable to obtain more data to facilitate the debugging process (e.g., more logs) for the specific user/tenant, without affecting the other users (in terms of performance and logging volume).
2) There is an issue with a specific component/service. In this situation, it may be desirable to trigger and collect all the logs relevant to this specific component.
3) There is an alert detected by APM (slowness, error rate is increased, etc.) Here, it might be desirable to automatically increase the logging level when such an alert occurs.

To adaptively control the volume/level of log data generated and/or provided to the software developer, the present framework (e.g., the system illustrated in FIG. 1) can be used to identify (e.g., by the instrumentation agent 132, based on instrumentation requests received from the intermediate management server 120) running code segments (e.g., segments or lines in the bytecode instance of the application process) that correspond to code lines in the source code that include the data capture instructions/command (e.g., commands to output log files). Having identified the appropriate segment of the running code, the system (e.g., the instrumentation agent) causes modification of the identified line(s) in running code (e.g., the bytecode) that cause the data captures into conditional code statements that cause a change in the data capture level when particular contextual conditions occur (e.g., specific user or company identity, change in resource usage, receipt of certain alerts, etc.) In some embodiments, conditional statements to regulate data captures and outputs can also be included with injection point objects that are to be added to running code (to regulate the level of data produced or outputted).

The debugging framework described herein (which may be part of a software development kit, or SDK), deployed for developing software applications, may use a mapped diagnostic context (MDC) to handle (manage) log data from different threads or processes. In such embodiments, the contextual information may be based on labels (metadata) used to identify specific users and processes. For example, a user may add information such as the user Id, company Id, etc., to the process that is to be debugged. Specific data capture code statements within the running code (e.g., in the bytecode), that correspond to source code statements available to the user/developer, can be identified (e.g., by having the instrumentation agent translate a specified source code statement to its bytecode equivalent, and searching for the location within the bytecode that substantially matches the translation of the source code statement). The identified running code statements can then be modified into conditional statements with an adjustable data capture granularity level that is triggered when the conditions in the modified conditional code match the current contextual information for the running application process (or to more global contextual conditions). For example, a triggering condition that is based on labels may cause action (collecting log data) only if the labels associated with the executing process match the labels defined in the modified statement. To illustrate, multiple instances of process may be invoked in the application system, with each such instance labelled with information that may include the user ID and/or company ID launching those process instances. Data capture statements within the bytecode are modified to include a triggering condition that is met for a particular user ID (for example, the user ID associated with a company's administrator). In this illustrative example, the modified statement will be triggered (to capture data at a reduce or heighten granularity level, or to perform some other action) in response to the user ID of the running instance matching the user ID specified by the developer (e.g., through an instrumentation request). In some examples, similar conditional statements can also be added to injection point objects requested/provided by the developer, with such conditional injection point object statements triggered in response to occurrence of current contextual information.

In some embodiments, adaptive dynamic observability may be controlled through an observability management system that may be controlled through a user interface such as the one shown in FIGS. 3 and 4 (as will be discussed in greater detail below). The user can define one or more contextual rules for a particular data capture operation (typically with a running bytecode, but also for injection point objects), with rules that may include one or more of:

1) A Trigger—such a trigger can be manually activated (through a button provided in the interface) or may define a webhook that cause the object to be triggered in response to external triggers (e.g., in response to a particular alert received from an alerting system).
2) Condition: expression that will use the MDC labels to distinguish between different threads or instances of a process, and trigger action only in response to a match between the expression in the object and the labels for the respective processes.
3) Action, which defines what packages/classes will be affected by the triggered object and what log level to use (e.g., how much information to capture and/or forward to the user).
4) Recovery: when to stop the action. This can be defined using a timer (terminating the operation of the object at a specific time or after expiry of a time interval following the triggering occurrence, a webhook (terminating the operation of the object in response to some external trigger or evert), or through manual termination of the operation of the object.

Figure 3:
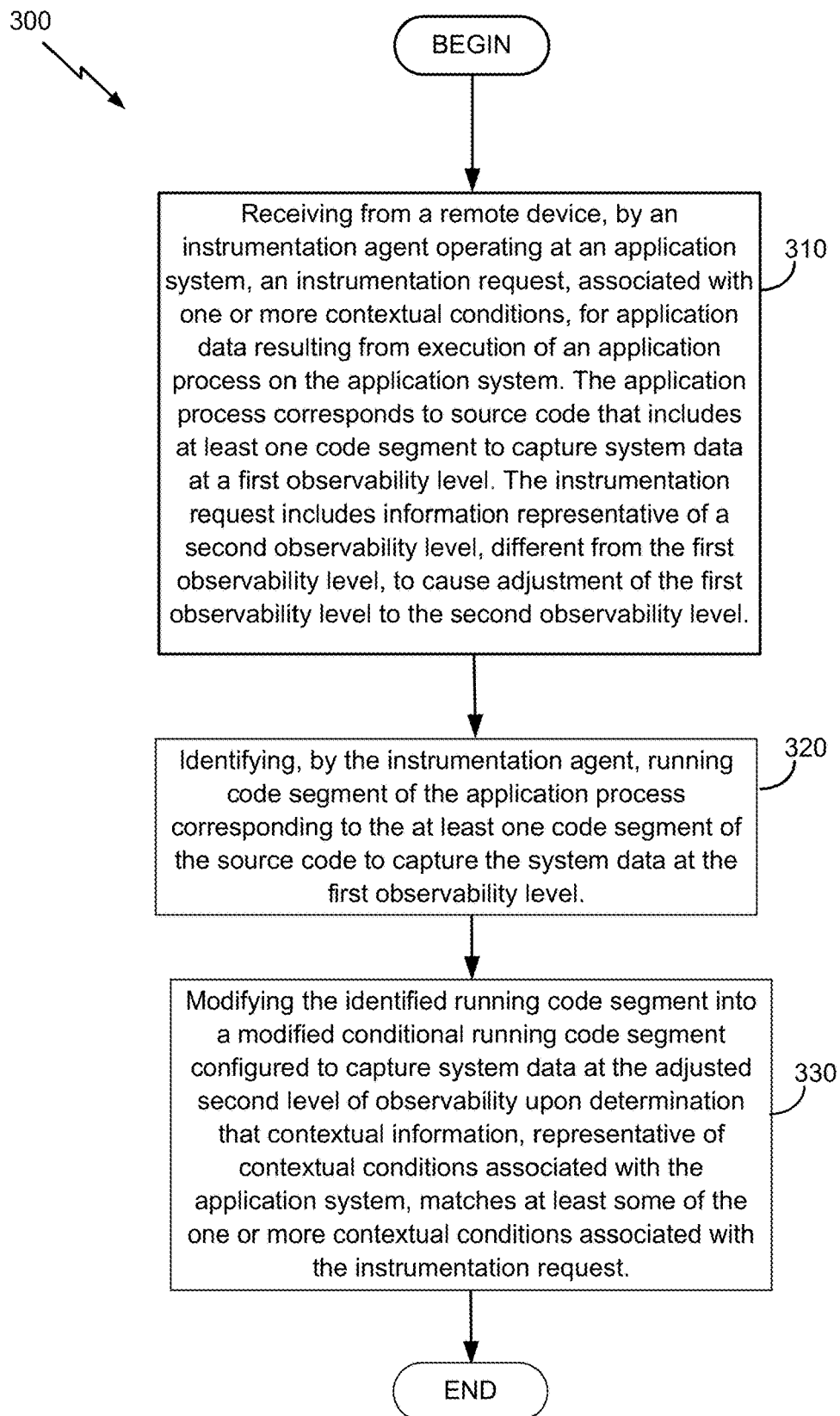
FIG. 3 is a flowchart of an example procedure to implement dynamic observability of data generated during debugging and application development.

With reference next to FIG. 3, a flowchart of an example procedure 300 to implement dynamic observability of data generated during debugging and application development processing is shown. The procedure 300 includes receiving 310 from a remote device, by an instrumentation agent (e.g., the agent 132 of FIG. 1) operating at an application system, an instrumentation request, associated with one or more contextual conditions, for application data (e.g., a data capture) resulting from execution of an application process on the application system. The application process corresponds to source code (with a copy of the source code available to the developer at the remote terminal communicating with the application system via, for example, the intermediary management system) that includes at least one code segment (code line or code statement) to capture system data at a first observability level (e.g., a log file data capture at some first specified data granularity). The instrumentation request includes information representative of a second observability level, different from the first observability level, to cause adjustment of the first observability level to the second observability level. Typically, the instrumentation request specifies the second observability level, but does not need to specify the first (initial) observability level which is already specified in the source code (and in the corresponding bytecode), and/or in a configuration file. In some examples, the instrumentation request may include further information, such as information specifying one or more of location of statements to be adjusted from the first observability level to the second observability level, package name, at least one of the one or more contextual conditions, etc.

As noted, in some examples, receiving the one or more instrumentation requests for application data from the remote device may include receiving the one or more instrumentation requests from a remote intermediate management server (such as the management server 120 of FIG. 1) configured to receive control input from a separate remote user terminal (e.g., such as the terminal 110), different from the application system, to control the instrumentation agent. The remote intermediate management server is generally further configured to control communication between a plurality of deployed instrumentation agents, that include the instrumentation agent at the application system, and a plurality of remote user terminals. In some embodiments, the application system may include one or more production-environment servers, and the application process may be a production-environment process. In some examples, the procedure 300 may further include attaching the instrumentation agent to one or more application processes executing on the application system.

As further depicted in FIG. 3, the procedure 300 further includes identifying 320, by the instrumentation agent, running code segment (e.g., a statement within the bytecode) of the application process corresponding to the at least one code segment of the source code to capture the system data at the first observability level. As noted, the instrumentation agent may be configured to translate or convert the source code statement (as may be indicated in the instrumentation request received) relating to the data capture, into a resultant translation, and to search the bytecode for a statement substantially matching the resultant translation.

The procedure 300 additionally includes modifying 330 the identified running code segment into a modified conditional running code segment configured to capture system data at the adjusted second level of observability upon determination that contextual information, representative of contextual conditions associated with the application system (i.e., existing contextual information), matches at least some of the one or more contextual conditions associated with the instrumentation request.

The contextual information (i.e., the existing contextual condition of the application system) can be based on any global state available from the application system or any of the application processes running on it. The contextual information can include data in Mapped Diagnostic Context (MDC). Some examples of contextual information include UserId, TenantId, configuration data, etc. Thus, in some embodiments, contextual information may include one or more of, for example, identity information of the executing application process being executed, identity information of one or more users associated with the executing application process, dynamic system characteristics of the application system on which the application process is executing, alerts generated by an alert system of the application system on which the application process is executing, and/or system configuration information. Contextual information may also include historical information associated with the modified conditional running code segment. Such historical information may include, for example, a number of times that the modified conditional running code segment was triggered. Historical information may be used to terminate a modified conditional statement once the modified statement has been executed a certain number of times. In some examples the one or more contextual conditions may include expiration information specifying a time at which the modified conditional running code segment is disabled or is reverted to an earlier version running code segment configured to capture system data at the first level of observability.

In some embodiments, the procedure 300 may further include capturing the system data at the second observability level in response to a determination, when executing the modified conditional running code segment, that the contextual information for the application system matches at least some of the one or more contextual conditions associated with the instrumentation request. Therefore, in some situations, the modified conditional statement will be triggered if only some (but not necessarily all) of the specified contextual conditions are satisfied. In some examples, all the contextual conditions would need to be satisfied before the modified conditional statement is triggered. In some embodiments, the modified conditional statement may have been modified so that when at least some of the current contextual information does not match the conditional statement of the modified running code, the data capture is performed at the original observability level. Thus, in such embodiments, the procedure 300 may further include capturing the system data at the first observability level in response to a determination, when executing the modified conditional running code segment, that the contextual information does not match the one or more contextual conditions associated with the instrumentation request.

The modified conditional running code segment configured to capture system data at the adjusted second level of observability may be configured to capture, for example, log data (in some embodiments, captured data may also include machine state data, performance metric data, etc.) The captured system data at the second level of observability may have a higher data granularity than captured system data at the first level of observability.

In some examples, the procedure 300 may further include receiving, by the instrumentation agent, one or more additional instrumentation requests for application data resulting from execution of the application process on the application system, and processing the received one or more additional instrumentation requests for application data to generate one or more injection point objects configured to obtain blocks of application data. In such embodiments, the procedure additionally includes inserting the one or more injection point objects into the running code of the application process, and capturing one or more blocks of application data resulting from the inserted one or more injection point objects during the execution of the application process without causing stoppage of the execution of the application process. Capturing the one or more blocks of application data resulting from the inserted one or more injection point objects may include dynamically adjusting level of data being captured or outputted based, at least in part, on the current contextual information.

At least one of the injection point objects may include a multi-point injection point object (e.g., a multi-point script injection point object) that includes multiple cooperating object parts that are each inserted into one of multiple insertion points of the running code for the application process, with the multi-point injection point configured to capture application data generated from execution of an interval of the running code for the application process bounded by the multiple insertion points into the running code corresponding to the multiple object parts of the multi-point injection point object.

Processing the one or more instrumentation requests to generate the one or more injection point objects may include generating the script object, including generating one or more of, for example, a counter script injection point object configured to count number of occurrences of a line of code for the executing application process, and/or a trace script injection point object to cause capture of trace data for the executing application process. Processing the one or more instrumentation requests to generate the one or more injection point objects may include generating the script object, including generating a TicToc script injection point object comprising a root object and an associated leaf object. In such embodiments, inserting the one or more injection point objects may include inserting the root object into a starting location of a specified section of the running code of the application process, and inserting the leaf object into an end location of the specified section of the running code. Capturing the one or more blocks of application data may include capturing the application data for the executing application process corresponding to the specified section of the running code based on the inserted root object and leaf object.

The application system may include one or more production-environment servers, and the application process may include a production-environment process.

Source Versioning

Another feature that may be incorporated into the debugging and application development platforms and implementations described herein is the source versioning feature. The source versioning feature helps users validate that the source code they are working on (and with respect to which they are performing debugging operations) is the same as the source code that was compiled to the running bytecode (or executable) they are debugging.

In example embodiments of the source versioning implementation, for a new action that is added (e.g., via the plugin), the source version of the code corresponding to the bytecode (or executable) being operated on is determined (e.g., via a command such as SourceVersionRetriever.java: getSourceVersion). The determined SourceVersion value is sent to the server as a field in a debugging action (e.g., launched through the debugging platforms described herein). The sourceVersion field in each such action represents the version of the code of the owner of the action (i.e., the user who set the action), and not the version of the bytecode in the agent process. The server then passes the source version value to the agent, which in turn compares it to the source version of the running bytecode (via, for example, the ClassPathLookup.java:compareSourceVersions command in the java agent jars). In the event the source versions do not match, the agent may report the mismatch using, for example, the breakpoint.sourceVersionMatch Boolean field. If, on the other hand, the versions match, nothing needs to be reported.

The agent then continues to add the injection point object (e.g., multi-point object). In some situations, the injection point object may be added even if the source versions do not match. In situations where there are multiple agents, the server aggregates the Boolean reports from the agents into a single list in the ActionDTO. That list (e.g., mismatchingSourceVersionAgentIds) contains the agent IDs of all agents that are running bytecodes that do not match to the respective actions' source versions.

In situations where there are multiple clients, e.g., when an injection point object set by a User B that arrives to the plugin of a user A, the User A plugin compares its source version to the one in the action, and shows a warning to the user in case of a mismatch.

In some embodiments, the feature can be turned off via a settings view of the interface (Settings→Lightrun→Show Version Warnings). In some embodiments, the feature is considered to be "turned off" when the value of the sourceVersion field in the action is null. It is to be noted that command-line interfaces (CLIs) typically do not provide source version support, and thus the field may always be set to null for CLI actions.

In some embodiments, a "containment" heuristic helps to handle situations where the compiler optimizes out code/variables. This can be done by checking not only that the source version of the code used by the user matches the source code from which the current bytecode or executable is running, but also checking, in the event that the source version test is satisfied, that the source code segment on which the user's action is to be performed approximately matches the source code segment corresponding to the executing bytecode. Particularly, the source version field of a given action (e.g., an action such as "isPrime:7-15-num; main:21-27-args") may include information (e.g., in the form of a long string) about the code file on which the particular action is to be performed. Such information may include the start line, end line, parameter names, etc., for the code segment for which the particular action is to be used. The source code version is matched against the source code corresponding to the running bytecode (or executable), and is also checked to see if it is "contained" in it. For example, the source segment the user is using (at the remote terminal) is deemed to be contained within the source segment of source code corresponding to the running bytecode (and thus the source code at the remote terminal and that corresponding to the running bytecode are deemed to substantially match) if: a) the user source code start line is less or equal to the start line of the source code of the bytecode, b) the source code (used by the user) end line is more or equal to the bytecode end-line, and c) source code parameters (for the source code used by the user) match the bytecode's source code parameters. This matching condition can be expressed as follows:

User_end_source_code start-line≤Running_source_code start-line;
User_end_source_code end-line≥Running_source_code end-line; and
User_end_source_code parameters⊆Running_source_code parameters.

where User_end_source_code represents the source code available to the user at the remote terminal (e.g., at the station 110 of FIG. 1) and Running_source_code represent the source code corresponding to the bytecode (or executable) running at the application server.

Figure 4:
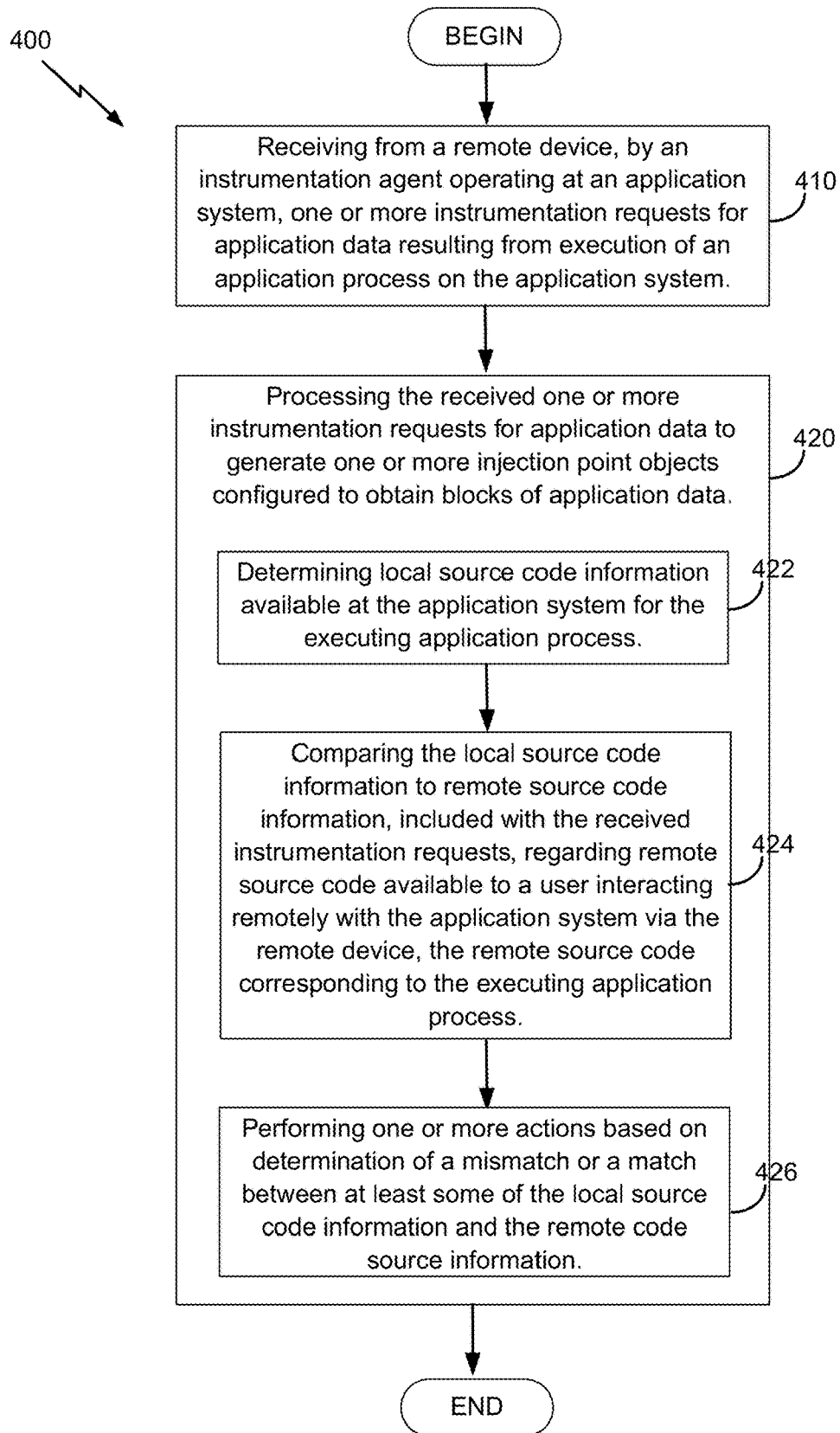
FIG. 4 is a flowchart of an example procedure implementing an application development and debugging platform with a source level validation (source versioning) feature.

With reference to FIG. 4, a flowchart of an example procedure 400 implementing an application development and debugging platform (generally at the application system, and more specifically at instrumentation agent at the application system) with a source level validation feature (also referred to as source versioning) is shown. The procedure includes receiving 410 from a remote device, by an instrumentation agent operating at an application system, one or more instrumentation requests for application data resulting from execution of an application process on the application system. As noted above, the instrumentation requests may be received from a remote intermediate management server (such as the management server 120 of FIG. 1), different from the application system, configured to receive control input from a separate remote user terminal (e.g., such as the terminal 110) to control the instrumentation agent. The data transmitted to the intermediate management server may include action data representative of injection point object requests made by the user to whom a local version of the source code (corresponding to the particular application process executing at the application system) is available.

As further illustrated in FIG. 4, the procedure 400 additionally includes processing 420 the received one or more instrumentation requests for application data to generate one or more injection point objects configured to obtain blocks of application data. The processing 420 includes determining 422 local source code information available at the application system for the executing application process, comparing 424 the local source code information to remote source code information, included with the received instrumentation requests, regarding remote source code available to a user interacting remotely with the application system via the remote device, with the remote source code corresponding to the executing application process, and performing 426 one or more actions based on determination of a mismatch or a match between at least some of the local source code information and the remote code source information.

In some embodiments, comparing the local source code information to the remote source code information may include comparing local source code versioning information included with the local source code information to remote source code versioning information included with the remote source code information. In such embodiments, performing the one or more actions may include sending a mismatch notification in response to a mismatch between the local source code versioning information (for the source code at the application system) and the remote source code (available at the remote terminal) versioning information.

In some examples, the procedure 400 may further include aggregating information regarding the mismatch between the local source code versioning information and the remote source code versioning information into a global list (e.g., the mismatchingSourceVersionAgentIds list referenced above) of versioning mismatch information accessible by a plurality of instrumentation agents operating at the application system.

In some embodiments, comparing the local source code information to the remote source code information may include determining from the local source code information local code characteristics associated with the one or more instrumentation requests, the local code characteristics including a local start line, a local end line, and local parameters associated with at least one segment of the local source code, determining from the remote source code information remote code characteristics associated with the one or more instrumentation requests, the remote code characteristics including a remote start line, a remote end line, and remote parameters associated with at least one segment of the remote source code available to the user, and determining whether the local code characteristics are contained within the remote code characteristics. Determining whether the remote code characteristics are contained within the local code characteristics may include, for example, determining whether the remote start line is less than or equal to the local start line, determining whether the remote end line is greater than or equal to the local end line, and determining whether the remote parameters are all included in the local parameters.

The procedure 400 may further include inserting the one or more injection point objects into the code of the application process, and capturing one or more blocks of application data resulting from the inserted one or more injection point objects during the execution of the application process without causing stoppage of the execution of the application process (and preferably without affecting state data associated with the executing application process, or minimally affecting the state data associated with the executing application process), with at least one of the injection point objects including a multi-point injection point object that includes multiple cooperating object parts that are each inserted into one of multiple points of the code for the application process, the multi-point injection point being configured to capture application data generated from execution of a segment of the code for the application process bounded by the multiple insertion points of the code corresponding to the multiple object parts of the multi-point injection point object. Inserting the one or more injection point objects may include inserting a particular one of the one or more injection point objects in response to a determination that the local source code information substantially matches the remote code source information.

In some situations, a determination of a mismatch may preclude the insertion/injection of the injection point object for which the associated source code at the remote user terminal does not substantially match the version of the source code at the local application system. Thus, in such situations, performing the one or more actions may include aborting insertion of a particular injection point object from the one or more injection point objects in response to a determination of a mismatch between the local source code information and the remote code source information associated with the particular injection point object. It should be noted that some minor discrepancies between the local and remote source code versions may be permitted to account for variations resulting from different environments or different hardware for the devices where the local and remote source code versions are stored.

Sandbox Feature

As noted, in some embodiments, execution of injection point objects, particularly more complex script objects with multiple insertion points (spanning multiple commands/statements in the code) carries a risk that the injection point object would result in adverse impact to the application system (e.g., would adversely change the machine state, overwrite important data records, cause the system to enter an infinite loop, would cause intolerable performance slowdown, etc.) To mitigate some of the risk associated with executing injection point objects, the platforms described herein implement an evaluation (testing) process (referred to as a "sandbox"), which in some embodiments is realized as an interpreter, and that can be controllably performed for injection pointer objects that are determined to have an unknown risk associated with executing them. Such an interpreter can be implemented to analyze and evaluate functions included in conditions and statements within injection point objects, and determine whether such objects have an adverse impact on the application process or on the application system (e.g., whether the objects cause side effects such as modifying static members of a class).

The interpreter may be configured to evaluate the script (e.g., evaluate the Abstract Syntax Tree, or AST, built from the expressions, e.g., Java Virtual Machine (JVM) expressions to be evaluated in a log or a snapshot) at the injection point. The interpreter is configured to block any "unacceptable" operations such as, for example, a) writing to an external state (that is not part of the expression evaluation, b) performing system calls, c) performing native calls, and/or d) throwing an exception. The interpreter is generally also be configured to protect again "infinite loop" expressions, and so the interpreter can be implemented to limit the number of steps allowed to be executed by it. A drawback of the use of this type of evaluation process (whether implemented as an interpreter, or otherwise) is that it slows down the execution of the application process since needs to perform a lot of checks before every command that is executed. However, there are a lot of "safe" statements (methods and function calls) in the standard java library (or in other programming languages that are used to implement the application system) that are "read-only" expressions, or that are otherwise known to be low-risk expressions/statements. This knowledge can be used in conjunction with the testing processes (the sandbox) to improve the debugging processes.

Particularly, in some embodiments, the evaluation process may be invoked based on a risk level associated with the particular injection point object. The approaches described herein are configured to assess a level risk associated with a particular injection point object, and to determine the subsequent processing/handling of the particular object based on the assessed level of risk. For example, if it is determined that the particular level of risk is low (or that there is no risk) for the particular injection point object, execution of the particular injection point object may be performed by the executing process (rather than by the evaluation process). By determining a priori that the particular injection point object is safe (or at least is deemed to be safe), and thus executing the injection point object within the executing process (instead of within the evaluation process), the computational effort required to perform the injection point object is reduce, and the performance of the application system (including reduced latency) is improved. If the assessed risk is determined to be high (determination of level of risk may be based on comparison of part of, or all of, the statements of the particular object to pre-determined lists specifying risky or safe statements), the execution of the particular object may be aborted. In the event that the risk level is uncertain (typically when the statements in the object include function calls whose resultant execution effects cannot completely ascertained), the evaluation processes (e.g., implemented as an interpreter) may be configured to execute the particular object one statement at a time. The evaluation process may itself call/invoke another evaluation process if it encounters functions calls who impact on the system's state is unknown. In some embodiments, the assessment of the risk level (e.g., comparison of statements in the particular injection point object to existing lists of safe and risky statements) may be performed by the instrumentation agent, which can then launch the evaluation process if it cannot match it to the existing safe and risky lists of object statements.

The interpreter implementations described herein to evaluate injection point objects may be configured to include a 3-state interpreter logic. Every time that the evaluation process starts, a determination is made whether the object being evaluated belongs to a white/black/or gray category. White procedures include all the statements/expressions/methods that are known as safe (for example all the methods under java.lang.Math). Therefore, those "safe" processes do not need to be carefully evaluated by the evaluation process, but instead are evaluated outside the sandbox (e.g., with JVM evaluate command). Black list expressions/methods are potentially dangerous expressions methods, and if encountered the evaluation ceases (the user may be notified that the injection point object is not safe). An example for a method that falls into that category is java.lang.Object.notify, which is flagged because it may be unsafe to change the application flow. Expressions/methods that do not get classified into either the white (safe) or black (risky) categories, are deemed to be gray expressions/methods, and are evaluated by the interpreter (e.g., statement-by-statement). It is to be noted that when the interpreter encounters a function (or method) call within the statements/expressions it evaluates, the same logic would be applied (i.e., that function call within the code being evaluated would be checked against the white and black lists to determine how that nestled function call should be handled for evaluation purposes). In some embodiments, the initial determination (to assess the risk level associated with the statements comprising the particular injection point object) may be performed by the instrumentation agent (e.g., the agent 132 of FIG. 1), which may be implemented to determine whether the particular injection point object is to be performed within the application process, whether the evaluation process (e.g., an interpreter) is to evaluate the particular injection point object, or whether the particular injection point object should not be processed/evaluated at all.

While objects (comprising expressions, statements, and/or and method and functions calls) that perform read-only operations will generally be considered to be safe and could be performed outside the sandbox interpreter, there are non-read-only edge cases that will also be considered to be safe for execution outside the sandbox. Such edge-cases include, for example, some common and important functionality for big-data and streaming frameworks on distributed dataset and data frames (like Spark and Flink) that, for the sake of more efficient system performance, are categorized as safe (white) expressions/methods. Otherwise, if such expressions/methods types were not to be considered safe, many common expressions, requiring system calls, that are frequently used in the platforms described herein (the Lightrun Cloud™ platforms) would always be classified as not-safe expressions.

Part of the COMMAND functionality implemented for the platforms described herein allows the injection of small scripts. It is important that such scripts are not general scripts, but scripts that conform to an allowed structure. Those scripts usually need to write information into a shared data store (e.g., TicToc objects need to write the starting timestamps into a shared memory location), thus breaking the "read-only" assumption. Notwithstanding the wide range of functionality covered by such script statements, the pre-defined list mechanism can be used to specify common object script statements as being safe (i.e., list those expressions/methods as allowed statements under the white list) and thus clear them for execution outside the interpreter and directly within the executing application process.

As noted, in some implementations, an approach to minimize the impact that injection point objects may have on the application performance and/or its state (which may skew the true behavior of the application process, and thus hinder debugging or optimization of the process) is to include within the instrumentation agent (such as the agent 132 depicted in FIG. 1) a module/unit (e.g., implemented using an interpreter, such as Java language interpreter, or any other programming language interpreter) to execute and analyze the functions included in conditions and expressions for injection point objects, and determine if they have any potential side effects. Potential injection point objects that cause excessive adverse effects (or any adverse effects) on the state data for the application process can therefore be identified, discarded, or, if possible, modified during runtime.

The sandbox functionality maintains the integrity of the running server by minimizing (or altogether eliminating) side effects that the insertion of injection point objects may have on the machine state of a particular application process. For the purposes of side effect evaluation, some resultant behavior (such as the creation and use of temporary variables) is generally not considered to be a side effect that substantially impacts the state of the application. On the other hand, injection point objects that change members of a class will be considered as a problematic side effect.

Figure 5:
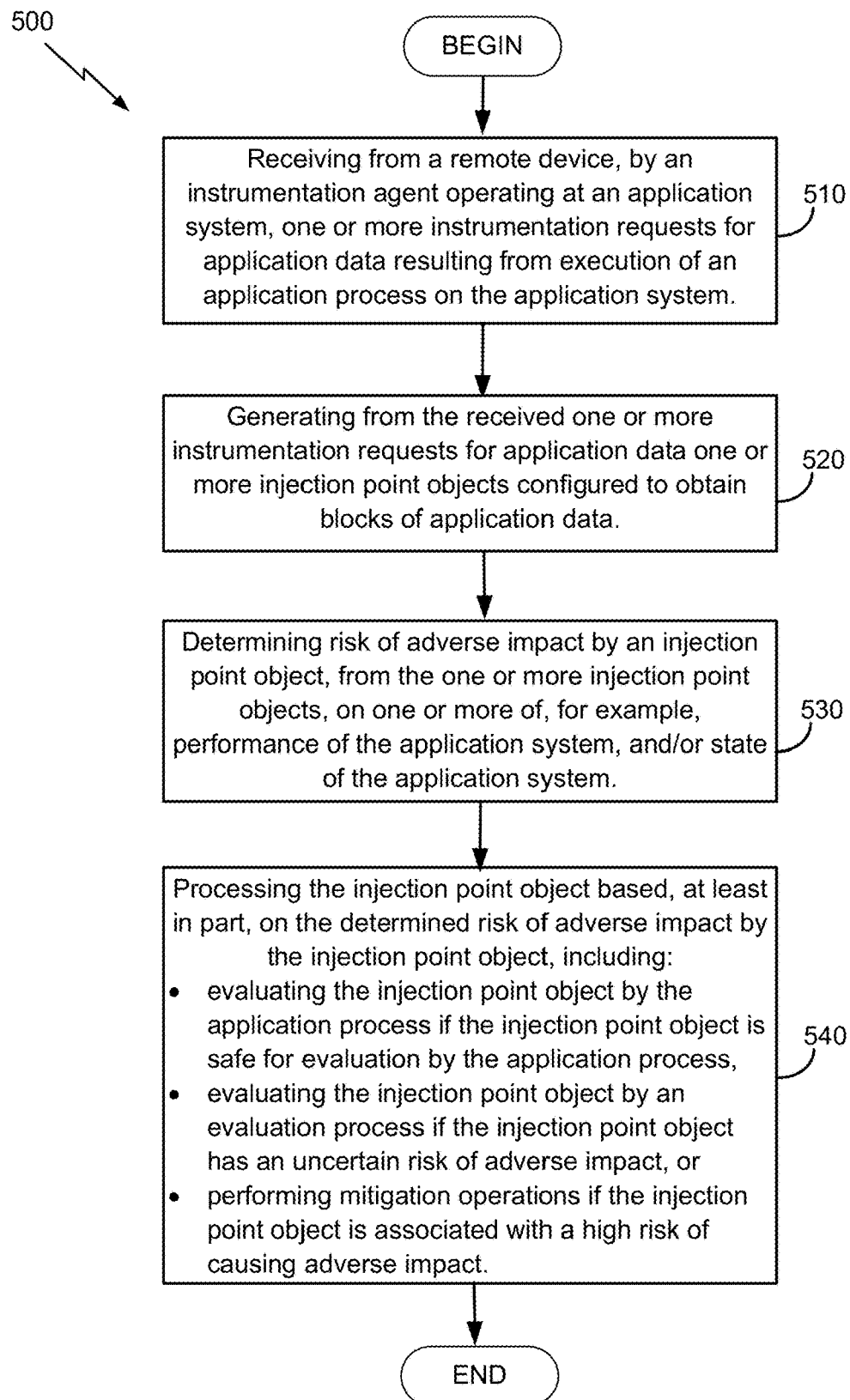
FIG. 5 is a flowchart of an example procedure implementing an application development and debugging platform with an evaluation process feature.

With reference next to FIG. 5, a flowchart of an example software debugging procedure 700 is shown. The procedure 500 includes receiving 510 from a remote device, by an instrumentation agent (such as the agent 132 of FIG. 1) operating at an application system (that includes the one or more servers constituting the system 130), one or more instrumentation requests for application data resulting from execution of an application process on the application system. As noted, the instrumentation requests may be received from a remote intermediate management server (such as the intermediate management server 120 of FIG. 1) configured to receive control input from a separate remote user terminal (e.g., such as the terminal 110), different from the application system, to control the instrumentation agent. The data transmitted to the intermediate manager may include action data representative of injection point object requests made by the user.

As further illustrated in FIG. 5, the procedure 500 also includes generating 720 from the received one or more instrumentation requests for application data one or more injection point objects configured to obtain blocks of application data. These are initial objects that, at this point, may not yet have been evaluated (tested) on the sandbox. In some examples, at least one of the injection point objects may include a multi-point injection point object that includes multiple cooperating object parts (e.g., such as the TicToc object described herein) that are each inserted into one of multiple points of the code for the application process, with the multi-point injection point object configured to capture application data generated from execution of a segment of the code for the application process bounded by the multiple insertion points of the code corresponding to the multiple object parts of the script injection point object. Because such multi-point objects span code segments (i.e., span several code (e.g., bytecode) expressions or statements), their impact on the state of the machine, and performance of the application process can be uncertain (e.g., whether these script object inefficiently tie up resources, or affect the state of the machine is some unforeseeable way). Consequently, testing/evaluating injection point objects like script objects (but not only) prior to fully releasing/injecting the objects into the code can mitigate some of the performance problems the use of such objects creates.

Thus, with continued reference to FIG. 5, the procedure 500 includes determining 530 risk of adverse impact by an injection point object, from the one or more injection point objects, on one or more of, for example, performance of the application system and/or state of the application system. Different metrics to quantify performance and impact criteria may be defined. In some embodiments, determining the risk of adverse impact by the injection point object may include comparing one or more portions of the injection point object to lists containing portions of injection point objects known to be safe, with each of the lists being associated with a respective risk level representative of the risk of adverse impact on the application system by expressions within the respective each of the lists. Examples of lists that are used to estimate the level of risk associated with statements in injection point objects include a safe list (also referred to as a white list) that includes injection point object portions determined to be safe to execute by application processes on the application system (e.g., read-only statements, common function calls executed by the platforms used, etc.), and an unsafe list (also referred to as a black list) that includes other injection point objects determined to be unsafe to execute application processes on the application system (this list may include statements that were determined during previous evaluations, e.g., through an interpreter, to be unsafe). As noted, the determination of risk may be performed by the instrumentation agent, by the evaluation process (e.g., interpreter) that is launched to evaluate injection point objects (e.g., upon execution of an injection point object the interpreter may always be launched in order to evaluate risk, and if there is no risk, the interpreter will return execution to the application process being debugged), or by some other process.

With continued reference to FIG. 5, the procedure 500 further includes processing 540 the injection point object based, at least in part, on the determined risk of adverse impact by the injection point object. The processing may include, a) evaluating the injection point object by the application process in response to a determination (e.g., by comparison the aforementioned lists, or by a machine learning engine) that the injection point object is safe for evaluation by the executing application process, b) evaluating the injection point object by an evaluation process (e.g., launching the interpreter to evaluate the statement(s) of the object, rather than executing statements directly from the application process) in response to a determination that the injection point object has an uncertain risk of adverse impact, or c) performing mitigation operations in response to a determination that the injection point object is associated with a high risk of causing adverse impact. Examples of mitigation operations include aborting execution of the injection point object (in some embodiments, an object determined to be associated with high level of risk may nevertheless be evaluated, e.g., in response to authorization from the user following receipt of a notification of an unsafe injection point object).

In some examples, processing the injection point object may include evaluating the injection point object within the application process in response to a determination that all portions of the injection point object are included in the safe list, or, in response to a determination that a portion of the injection point object is included in the unsafe list, performing one or more of, for example, aborting execution of the injection point object and/or sending a notification that the at least one injection point is not safe. When a determination is made that at least one portion of the evaluated injection point object is not included in the safe list or the unsafe list, the processing includes evaluating the injection point object within the evaluation process (e.g., an interpreter). Evaluating the injection point object within the evaluation process may include computing output resulting from execution of the injection point object within the evaluation process.

When the at least one portion of the injection point object includes a function or procedure call not included in any of the lists, processing the injection point object may further include invoking, upon reaching the function or procedure call not included in any of the lists, another instance of evaluation process to evaluate the function or procedure call not included in any of the lists, and, upon completing evaluation of the function or procedure call on the other instance of the evaluation process, returning to a first instance of the evaluation process to resume execution of the injection point object being evaluated.

In some examples, at least one of the injection point objects may include a multi-point t injection point object that includes multiple cooperating object parts that are each inserted into one of multiple points of a code representation for the application process, the multi-point injection point configured to capture application data generated from execution of a segment of the code representation for the application process bounded by the multiple insertion points of the code representation corresponding to the multiple object parts of the multi-point injection point object.

Additional Embodiments

Performing the various operations and procedures described herein may be facilitated by a computing system (e.g., a processor-based computing system). Particularly, at least some of the various devices/systems described herein, including the various components/nodes of FIG. 1 (such as the station 110, the intermediate management server 120, the production environment server(s) 130, and/or the instrumentation agent 132 when the agent is implemented, at least in part, in hardware), may be implemented using one or more processor-based devices.

Such a computing system(s) includes a processor-based device (also referred to as a controller device) such as a personal computer, a server, a specialized computing device, and so forth, that typically includes a central processor unit, or some other type of controller (or a plurality of such processor/controller units). In addition to the CPU, the system includes main memory, cache memory and bus interface circuits. The processor-based device may include a mass storage element, such as a hard drive (realize as magnetic discs, solid state (semiconductor) memory devices), flash drive associated with the computer system, etc. The computing system may further include a keyboard, or keypad, or some other user input interface, and a monitor, e.g., an LCD (liquid crystal display) monitor, that may be placed where a user can access them.

The processor-based device is configured to facilitate, for example, the implementation of debugging and application development tools according to the procedures and operations described herein. The storage device of the computing system may thus include a computer program product that when executed on the processor-based device causes the processor-based device to perform operations to facilitate the implementation of procedures and operations described herein. The processor-based device may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver(s)), for downloading related content to the connected system. Such peripheral devices may also be used for downloading software containing computer instructions to enable general operation of the respective system/device. The processor-based device may include one or more processors that include one or more central processing units (CPUs), one or more graphics processing units (GPU's, such as NVIDIA GPU's), special purpose logic circuitry, e.g., an FPGA (field programmable gate array), an ASIC (application-specific integrated circuit), a DSP processor, an accelerated processing unit (APU), an application processor, customized dedicated circuity, and other types of controllers, microprocessors, and computational circuits to implement, at least in part, the processes and functionality for the platforms, systems, processes, and methods described herein. Other modules that may be included with the processor-based device are speakers, a sound card, a pointing device, e.g., a mouse or a trackball, by which the user can provide input to the computing system. The processor-based device may run an operating system, e.g., Windows 10 operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory), electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A software debugging method comprising:
receiving from a remote device, by an instrumentation agent operating at an application system, one or more instrumentation requests for application data resulting from execution of an application process on the application system;
processing the received one or more instrumentation requests for application data to generate one or more injection point objects configured to obtain blocks of application data;
inserting the one or more injection point objects into code of the application process; and
capturing one or more blocks of application data resulting from the inserted one or more injection point objects during the execution of the application process without causing stoppage of the execution of the application process, wherein at least one of the injection point objects comprises a multi-point injection point object that includes multiple cooperating object parts that are each inserted into one of multiple insertion points of the code for the application process, the multi-point injection point object configured to capture application data generated from execution of a segment of the code for the application process bounded by the multiple insertion points of the code corresponding to the multiple object parts of the multi-point injection point object.

2. The method of claim 1, wherein capturing the one or more blocks of application data comprises:
determining level of server resources usage during execution of the production environment process; and
capturing a block of application data in response to a determination that the level of computing resource usage is below a predetermined resource threshold.

3. The method of claim 1, wherein the multi-point object comprises a multi-point script object configured to perform write operations into a dedicated memory area for the instrumentation agent shared by script injection point objects.

4. The method of claim 1, wherein generating the multi-point object comprises:
generating one or more of: a counter script injection point object configured to count number of occurrences of a line of code for the executing application process, or a trace script injection point object to cause capture of trace data for the executing application process.

5. The method of claim 1, wherein generating the multi-point object comprises generating a TicToc script injection point object comprising a root object and an associated leaf object;
wherein inserting the one or more injection point objects comprises inserting the root object into a starting location of a specified section of the code of the application process, and inserting the leaf object into an end location of the specified section of the code;
and wherein capturing the one or more blocks of application data comprises capturing the application data for the executing application process corresponding to the specified section of the code based on the inserted root object and leaf object.

6. The method of claim 1, wherein the one or more instrumentation requests includes an instrumentation request comprising information to cause adjustment of at least one segment of running code, corresponding to a source code segment for outputting data at a first observability level, into a modified conditional running code segment for outputting the data at a second observability data different from the first observability level.

7. The method of claim 6, wherein the instrumentation request includes further information to specify one or more of: location of statements to be adjusted from the first observability level to the second observability level, and one or more contextual conditions to trigger the modified conditional running code.

8. The method of claim 7, further comprising:
identifying, by the instrumentation agent, the at least one segment of running code for the application process for outputting data at a first observability level; and
modifying the identified at least one segment of running code into a modified conditional running code segment configured to output the data at the adjusted second level of observability upon determination that contextual information, representative of contextual conditions associated with the application system, matches at least some of the one or more contextual conditions included with the instrumentation request, wherein the contextual information comprises one or more of: identity information of the executing application process being executed, identity information of one or more users associated with the executing application process, dynamic system characteristics of the application system on which the application process is executing, alerts generated by an alert system of the application system on which the application process is executing, or system configuration information.

9. The method of claim 1, further comprising:
determining risk of adverse impact by an injection point object, from the one or more injection point objects, on one or more of: performance of the application system, or state of the application system; and
processing the injection point object based, at least in part, on the determined risk of adverse impact by the injection point object, wherein the processing comprises:
   evaluating the injection point object by the application process in response to a determination that the injection point object is safe for evaluation by the executing application process,
   evaluating the injection point object by an evaluation process in response to a determination that the injection point object has an uncertain risk of adverse impact, or
   performing mitigation operations in response to a determination that the injection point object is associated with a high risk of causing adverse impact.

10. The method of claim 9, wherein the evaluation process is implemented as an interpreter for the injection point object being evaluated.

11. The method of claim 9, wherein determining the risk of adverse impact by the injection point object comprises:
   comparing one or more portions of the injection point object to lists containing portions of at least some injection point objects, each of the lists being associated with a respective risk level representative of the risk of adverse impact on the application system by expressions within the respective each of the lists.

12. The method of claim 1, wherein processing the received one or more instrumentation requests comprises:
   determining local source code information available at the application system for the executing application process;
   comparing the local source code information to remote source code information, included with the received one or more instrumentation requests, regarding remote source code available to a user interacting remotely with the application system via the remote device, the remote source code corresponding to the executing application process; and
   performing one or more actions in response to a determination of a mismatch or a match between at least some of the local source code information and the remote code source information.

13. A system for software debugging comprising:
one or more application servers comprising:
   one or more memory storage devices to store programmable instructions, and
   one or more processing-based devices coupled to the one or more memory storage devices;
wherein the one or more application servers are configured to execute at least one instance of an application process represented by code stored on the one or more memory storage devices, and to:
   receive from a remote device one or more instrumentation requests for application data resulting from execution of the at least one instance of the application process on the one or more application servers;
   process the received one or more instrumentation requests for application data to generate one or more injection point objects, the generated one or more injection point objects configured to obtain one or more blocks of application data;
   insert the one or more injection point objects into code of the at least one instance of the application process; and
   capture the one or more blocks of application data resulting from the inserted one or more injection point objects during the execution of the at least one instance of the application process without causing the stoppage of the execution of the at least one instance of the application process;
wherein at least one of the one or more injection point objects comprises a multi-point injection point object that includes multiple cooperating object parts that are each inserted into one of multiple insertion points of the code for the at least one instance of the application process, the multi-point injection point configured to capture application data generated from execution of a segment of the code for the at least one instance of the application process bounded by the multiple insertion points of the code corresponding to the multiple object parts of the multi-point injection point object.

14. The system of claim 13, further comprising:
a plurality of remote user terminals, each being different from the one or more application servers; and
a remote intermediate management server, separate from the one or more application server and the plurality of remote user terminals, coupled through one or more communication links to the plurality terminal users, and coupled through at least one other communication link to the one or more application servers, wherein the remote intermediate management server is configured to:
   receive control input from a remote user terminal of the plurality of remote user terminals;
   generate, based on the control input, the one or more instrumentation requests to control operation of an instrumentation agent attachable to executing processes at the one or more application servers;
   transmit the one or more instrumentation requests to the instrumentation agent at the one or more application servers;
   receive the captured one or more blocks of application data from the instrumentation agent; and
   communicate the received one or more blocks of application data to the remote user terminal.

15. The system of claim 13, wherein the multi-point object comprises a multi-point script object configured to perform write operations into a dedicated memory area for the instrumentation agent shared by script injection point objects.

16. The system of claim 13, wherein the one or more application servers configured to generate the multi-point object are configured to:
   generate a counter script injection point object configured to count number of occurrences of a line of code for the executing at least one instance of the application process.

17. The system of claim 13, wherein the one or more application servers configured to generate the multi-point object are configured to generate a TicToc script injection point object comprising a root object and an associated leaf object;

wherein the one or more application servers are configured to insert the one or more injection point objects comprises inserting the root object into a starting location of a specified section of the code of the at least one instance of the application process, and insert the leaf object into an end location of the specified section of the code;

and wherein the one or more application servers configured to capture the one or more blocks of application data are configured to capture the application data for the executing at least one instance of the application process corresponding to the specified section of the code based on the inserted root object and leaf object.

18. The system of claim 13, wherein the one or more instrumentation requests includes an instrumentation request comprising information to cause adjustment of at least one segment of running code, corresponding to a source code segment for outputting data at a first observability level, into a modified conditional running code segment for outputting the data at a second observability data different from the first observability level.

19. The system of claim 13, wherein the one or more application servers are further configured to:

determine risk of adverse impact by an injection point object, from the one or more injection point objects, on one or more of: performance of the one or more application servers, or state of the one or more application servers; and process the injection point object based, at least in part, on the determined risk of adverse impact by the injection point object, wherein the one or more application servers configured to process the injection point object are configured to:

evaluate the injection point object by the at least one instance of the application process in response to a determination that the injection point object is safe for evaluation by the executing at least one instance of the application process, evaluate the injection point object by an evaluation process in response to a determination that the injection point object has an uncertain risk of adverse impact, or perform mitigation operations in response to a determination that the injection point object is associated with a high risk of causing adverse impact.

20. A non-transitory computer-readable media comprising computer instructions executable on one or more processor-based devices to:

receive from a remote device, by an instrumentation agent operating at an application system, one or more instrumentation requests for application data resulting from execution of an application process on the application system;

process the received one or more instrumentation requests for application data to generate one or more injection point objects configured to obtain blocks of application data;

insert the one or more injection point objects into the code of the application process; and capture one or more blocks of application data resulting from the inserted one or more injection point objects during the execution of the application process without causing stoppage of the execution of the application process;

wherein at least one of the injection point objects comprises a multi-point injection point object that includes multiple cooperating object parts that are each inserted into one of multiple points of the code for the application process, the multi-point injection point configured to capture application data generated from execution of a segment of the code for the application process bounded by the multiple insertion points of the code corresponding to the multiple object parts of the multi-point injection point object.

* * * * *